US012786044B2

(12) United States Patent
Memon et al.

(10) Patent No.: US 12,786,044 B2
(45) Date of Patent: Nov. 3, 2026

(54) DATA INPUT PROCESSING

(71) Applicant: Telefonaktiebolaget LM Ericsson (publ), Stockholm (SE)

(72) Inventors: Salman Memon, Montreal (CA); Alka Isac, Saint Laurent (CA); Manoj Kopparambil Nambiar, New Westminster (CA); Yue Ju, Mont-Royal (CA); Alexander Makerenko, Laval (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 203 days.

(21) Appl. No.: 18/711,609

(22) PCT Filed: Dec. 6, 2021

(86) PCT No.: PCT/IB2021/061376

§ 371 (c)(1),
(2) Date: May 19, 2024

(87) PCT Pub. No.: WO2023/105262

PCT Pub. Date: May 15, 2023

(65) Prior Publication Data

US 2025/0039037 A1 Jan. 30, 2025

(51) Int. Cl.
*H04L 41/0631* (2022.01)
*G06N 20/00* (2019.01)

(52) U.S. Cl.
CPC ......... *H04L 41/0631* (2013.01); *G06N 20/00* (2019.01)

(58) Field of Classification Search
CPC ........................ H04L 41/0631; H04L 41/0895
See application file for complete search history.

(56) References Cited

U.S. PATENT DOCUMENTS 7,191,161 B1 * 3/2007 Rai ........................ G06N 3/042 706/26
10,826,931 B1 * 11/2020 Quan ................. H04L 63/1441
(Continued)

FOREIGN PATENT DOCUMENTS

WO 2021/010871 A1 1/2021

OTHER PUBLICATIONS

International Search Report and Written Opinion issued for PCT/IB2021/061376 mailed on Jul. 19, 2022.
(Continued)

*Primary Examiner* — Hieu T Hoang
(74) *Attorney, Agent, or Firm* — Sonoda & Kobayashi Intellectual Property Law; Sarvajit S. Patil

(57) ABSTRACT

There is provided a computer-implemented method for processing a plurality of data inputs comprising information about a network. A plurality of machine learning models is trained (102) on the plurality of data inputs. Each machine learning model of the plurality of machine learning models is trained to generate a representation of at least one data input of the plurality of data inputs. A representation of each data input of the plurality of data inputs is generated (104) using at least one trained machine learning model of the plurality of trained machine learning models. The plurality of trained machine learning models and the generated representation of each data input are for use in resolving an issue in the network.

9 Claims, 13 Drawing Sheets

(56) References Cited

U.S. PATENT DOCUMENTS

| | | | | |
|---|---|---|---|---|
| 11,537,134 | B1* | 12/2022 | Wiest | G05D 1/0088 |
| 2010/0057418 | A1* | 3/2010 | Li | G06F 30/28 703/10 |
| 2018/0048661 | A1* | 2/2018 | Bird | H04L 63/1416 |
| 2019/0042988 | A1* | 2/2019 | Brown | G06F 16/9535 |
| 2019/0306011 | A1* | 10/2019 | Fenoglio | H04L 41/142 |
| 2020/0136888 | A1* | 4/2020 | Jangam | H04L 41/024 |
| 2020/0304364 | A1* | 9/2020 | Tapia | G06N 7/01 |
| 2020/0320400 | A1* | 10/2020 | David | G06N 3/09 |
| 2021/0081837 | A1 | 3/2021 | Polleri et al. | |
| 2021/0182479 | A1* | 6/2021 | Kim | G06F 40/194 |
| 2021/0319179 | A1* | 10/2021 | Muffat | G06F 21/6245 |
| 2021/0334895 | A1* | 10/2021 | Kumar | G06N 20/00 |
| 2022/0327124 | A1* | 10/2022 | Sweeney | G06N 3/09 |
| 2022/0358149 | A1 | 11/2022 | Frank et al. | |
| 2023/0065398 | A1* | 3/2023 | Purdy | H04L 63/1433 |
| 2024/0212843 | A1* | 6/2024 | Kim | G06N 3/088 |

OTHER PUBLICATIONS

Mayank Kejriwal (Mar. 4, 2019). Domain-Specific Knowledge Graph Construction. Springer. http://books.google.ie/books?id=IKOLDwAAQBAJ&printsec=frontcover&dq=Domain-specific+knowledge+graph+construction&hl=&cd=1&source=gbs_api.

* cited by examiner

Aggregate Scores by different models by different methods for each document 712 714 716

| | Parameter 1 | Parameter 2 | Parameter 3 |
|---|---|---|---|
| Doc 1 | 5 | 0.4 | 20 |
| Doc 2 | 10 | 0.1 | 21 |
| Doc 3 | 2 | 0.9 | 25 |
| Doc 4 | 23 | 0.2 | 99 |

Selecting top 3 documents based on the different ensemble parameters 712 714 716 724

| | Parameter 1 | Parameter 2 | Parameter 3 |
|---|---|---|---|
| Doc 3 | 2 | 0.9 | 25 |
| Doc 1 | 5 | 0.4 | 20 |
| Doc 2 | 10 | 0.1 | 21 |
| Doc 4 | 23 | 0.2 | 99 |

Selected documents for the ticket 726

Doc 3 Doc 1 Doc 2

Figure 10 (continued)

DATA INPUT PROCESSING

TECHNICAL FIELD

The disclosure relates to a computer-implemented method for processing a plurality of data inputs, a computer-implemented method for identifying one or more data inputs for use in resolving an issue in a network, and entities configured to operate in accordance with those methods.

BACKGROUND

Ensuring network availability in a (e.g. telecommunications) network is an important consideration for operators and vendors of the network. Indeed, certain events in the network (e.g. network problems such as network outages) can result in significant legal and financial repercussions for both network operators and vendors. In many existing networks, service requests (SRs) are the primary method through which issues and problems are raised in the network (e.g. by operators to vendors) for resolution.

Generally, a network SR can be raised through two primary channels: email and customer support helplines. An SR typically contains a description of a relevant issue in the network, the magnitude of the issue, the network node(s) affected by the issue, and the documentation of any initial steps taken in response to the issue (e.g. troubleshooting steps taken to rectify a network problem). Commonly, the magnitude of the issue raised in the SR determines the priority given to the issue, e.g. as per a service-level agreement (SLA) between the operator and vendor of the network.

FIG. 1 illustrates an example of an existing process for handling an SR raised in a (e.g. telecommunications) network 304.

Timely resolution of an SR can be a complex task, usually requiring the expertise of a team of domain experts. As illustrated in FIG. 1, an SR may be created 302 by vendors and customers 300 of the network 304. The SR may be received by a customer support agent (CSA) in the network 304 who is tasked with resolving the SR. Customer support agents are typically experts in the relevant network domain. For example, if an SR is raised in a telecommunications domain, the CSA will most likely be a telecommunications expert. As illustrated in FIG. 1, in order to resolve the raised SR, the CSA (e.g. domain expert) mainly relies on a process involving manually examining one or more of product documentation, a knowledge base, logs and configuration data extracted from the network source of the relevant issue (e.g. a problematic network node), and their prior experience in solving SRs similar to the raised SR.

This existing technique, and other similar existing techniques, used in resolving SRs have several issues that make it difficult to diagnose a network issue and resolve an SR in an expeditious and reliable manner.

SUMMARY

As mentioned earlier, it can be difficult to diagnose a network issue and resolve an SR in an expeditious and reliable manner using existing techniques. In particular, the issues associated with existing techniques make it difficult to introduce automation to aid (e.g. a CSA) in diagnosing a network issue and resolving an SR in a faster and more reliable manner. One key challenge in automating such processes is linking semi-structured network data (e.g. network logs), informal data (e.g. prior SRs) and formal data (e.g. extensive product documentation). Moreover, automating knowledge-based aspects of the SR resolution process is complicated for a variety of reasons.

There already exist techniques for automating parts of the SR resolution process. In some of these existing techniques, supervised machine learning is used to resolve certain types of problems in the network. These existing techniques generally rely on the use of labelled data (e.g. labelled network documentation). However, labelled data is a luxury that is often not available in niche network domains (e.g. wireless telecommunications network domains). In particular, network authorities, such as subject matter experts (SMEs), are typically too busy to carry out the tedious task of labelling network data. Moreover, labelled data can introduce unintentional biases into the data as most of the SMEs focus on a particular network product or sub-domain and will typically propose a recommendation from their specific area of expertise when asked to label related documents. These issues result in existing techniques being slow and inaccurate.

The problems with the existing techniques are compounded by the fact that information important for issue resolution (e.g. from an expert or knowledgeable source) can be delayed due to uncontrollable factors like unavailability of an expert at a particular point in time, unfamiliarity with the relevant network hardware, and/or incomplete network documentation. Moreover, as new network hardware (e.g. products) and software versions are introduced, issue resolution techniques must continually adapt in order to keep up with the state of the network. These bottlenecks in existing SR resolution techniques can often result in increased turnaround times for resolving the relevant issue associated with the SR.

In some existing techniques, standard natural language processing (NLP) approaches have been applied in an attempt to automate issue resolution. In general, NLP techniques largely rely on transfer learning to provide solutions to problems. Transfer learning typically involves applying a pre-trained model, which is trained on publicly available data, as a starting point for a given task. However, such existing NLP approaches struggle to adapt to issue resolution in the complex network domains, such as the telecommunications network domain, and are hindered by the challenges associated with data labelling as described above.

Therefore, although some NLP approaches may offer good performance for some tasks, existing NLP techniques frequently do not adapt well to the automation of issue resolution in (e.g. telecommunications) network domains. Specifically, one issue with the application of NLP techniques is the inability of pre-trained models to generalise to network-specific technical documents. For example, the specificity of data in the telecommunications domain (e.g. with regard to vocabulary, acronyms, proprietary interfaces, documentation, etc.) is challenging for common NLP models to handle, as such particular data formats are not encountered by an NLP model during training.

The problem is further compounded by free text fields that are usually available in network SRs, which are typically filled out during the SR raising process. These free text fields introduce grammatical inconsistencies, spelling mistakes, and (e.g. telecommunications) network specific abbreviations making it difficult for existing models to link content of the SR to relevant network (e.g. product) documentation. These types of inconsistencies can produce significant differences between the embedding of free text fields in SRs and the embeddings of network documentation, rendering most of the existing techniques ineffective.

Moreover, the vastness of certain network domains, such as the telecommunications domain, greatly reduces the availability of training data for advanced neural network-based models as they greatly rely on unbiased labelling (e.g. by an SME in a sub-domain). These factors bring in serious limitations to many existing NLP techniques practised in the industry.

It is an object of the disclosure to obviate or eliminate at least some of the above-described disadvantages associated with existing techniques.

Therefore, according to an aspect of the disclosure, there is provided a first computer-implemented method for processing a plurality of data inputs comprising information about a network. The first method comprises training a plurality of machine learning models on the plurality of data inputs. Each machine learning model of the plurality of machine learning models is trained to generate a representation of at least one data input of the plurality of data inputs. The first method also comprises generating a representation of each data input of the plurality of data inputs using at least one trained machine learning model of the plurality of trained machine learning models. The plurality of trained machine learning models and the generated representation of each data input are for use in resolving an issue in the network.

According to another aspect of the disclosure, there is provided a second computer-implemented method for identifying the one or more data inputs for use in resolving an issue in the network. The second method comprises, in response to receiving information about the issue in the network, generating a representation of the information about the issue using at least one trained machine learning model of a plurality of trained machine learning models. The second method also comprises identifying one or more data inputs of a plurality of data inputs that are relevant to the issue based on the generated representation of the information about the issue. The one or more identified data inputs are for use in resolving the issue.

According to another aspect of the disclosure, there is provided a first entity configured to operate in accordance with the first method described earlier. In some embodiments, the first entity may comprise processing circuitry configured to operate in accordance with the first method described earlier. In some embodiments, the first entity may comprise at least one memory for storing instructions which, when executed by the processing circuitry, cause the first entity to operate in accordance with the first method described earlier.

According to another aspect of the disclosure, there is provided a second entity configured to operate in accordance with the second method described earlier. In some embodiments, the second entity may comprise processing circuitry configured to operate in accordance with the second method described earlier. In some embodiments, the second entity may comprise at least one memory for storing instructions which, when executed by the processing circuitry, cause the second entity to operate in accordance with the second method described earlier.

According to another aspect of the disclosure, there is provided a system comprising one or both of the first entity described earlier and the second entity described earlier.

According to another aspect of the disclosure, there is provided a computer program comprising instructions which, when executed by processing circuitry, cause the processing circuitry to perform the first method described earlier and/or the second method described earlier.

According to another aspect of the disclosure, there is provided a computer program product, embodied on a non-transitory machine-readable medium, comprising instructions which are executable by processing circuitry to cause the processing circuitry to perform the first method described earlier and/or the second method described earlier.

Therefore, there is provided an advantageous technique for processing a plurality of data inputs comprising information about a network. There is also provided an advantageous technique for identifying the one or more data inputs for use in resolving an issue in the network. The manner in which the plurality of data inputs is processed provides for the training of a plurality of machine learning models to generate representations of the plurality of data inputs, which can be used to identify one or more relevant data inputs of the plurality of data inputs for more reliably and efficiently resolving issues in the network. The techniques described herein can further improve the reliability and efficiency of resolving issues in the network, reduce the workload of network support agents (e.g. customer support agents (CSAs)), and can reduce the duration of potential problems and outages existing in the network.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

Figure 1:
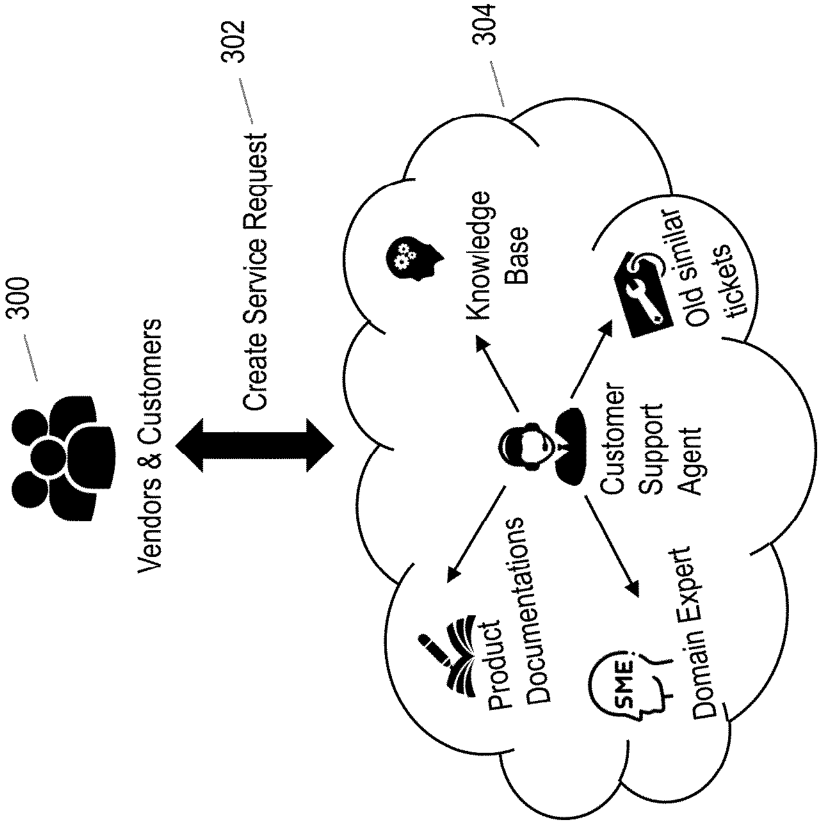
FIG. 1 is a schematic illustration of an existing process for handling a service request.

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

As mentioned earlier, there is described herein an advantageous technique for processing a plurality of data inputs comprising information about a network. This technique can be performed by a first entity. There is also described herein an advantageous technique for identifying one or more data inputs for use in resolving an issue in the network. This technique can be performed by a second entity. The first entity and the second entity described herein may communicate with each other, e.g. over a communication channel, to implement the techniques described herein. In some embodiments, the first entity and the second entity may communicate over the cloud. The techniques described herein can be implemented in the cloud according to some embodiments. The techniques described herein are computer-implemented.

The network referred to herein can be any type of network. For example, the network referred to herein can be a telecommunications network. In some embodiments, the network referred to herein can be a mobile network, such as a fourth generation (4G) mobile network, a fifth generation (5G) mobile network, a sixth generation (6G) mobile network, or any other generation mobile network. In some embodiments, the network referred to herein can be a radio access network (RAN). In some embodiments, the network referred to herein can be a local network, such as a local area network (LAN). In some embodiments, the network referred to herein may be a content delivery network (CDN). In some embodiments, the network referred to herein may be a software defined network (SDN). In some embodiments, the network referred to herein can be a fog computing environment or an edge computing environment. In some embodiments, the network referred to herein can be a virtual network or an at least partially virtual network. Although some examples have been provided for the type of network referred to herein, it will be understood that the network referred to herein can be any other type of network.

The advantageous techniques described herein involve the use of artificial intelligence or machine learning (AI/ML). For example, an AI/ML engine can be embedded on a back-end of a network node (e.g. a server) in order to provide training and inference according to the techniques described herein. In general, techniques based on AI/ML allow a back-end engine to provide reliably and fast inference and feedback, e.g. in real time (or nearly real-time). In particular, the techniques described herein can beneficially enable identification of one or more data inputs for use is resolving an issue in a network.

Figure 2:
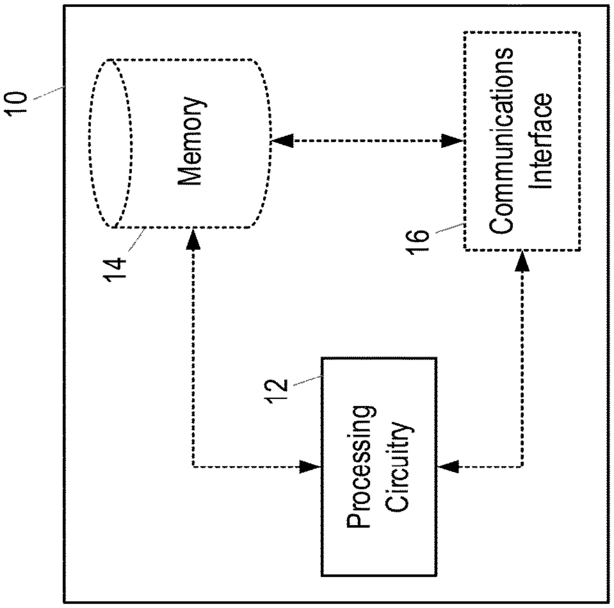
FIG. 2 is a block diagram illustrating a first entity according to an embodiment.

FIG. 2 illustrates a first entity 10 in accordance with an embodiment. The first entity 10 is for processing a plurality of data inputs comprising information about a network. The first entity 10 referred to herein can refer to equipment capable, configured, arranged and/or operable to communicate directly or indirectly with the second entity referred to herein, and/or with other entities or equipment to enable and/or to perform the functionality described herein. The first entity 10 referred to herein may be a physical entity (e.g. a physical machine) or a virtual entity (e.g. a virtual machine, VM).

As illustrated in FIG. 2, the first entity 10 comprises processing circuitry (or logic) 12. The processing circuitry 12 controls the operation of the first entity 10 and can implement the method described herein in respect of the first entity 10. The processing circuitry 12 can be configured or programmed to control the first entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first entity 10. In some embodiments, the processing circuitry 12 can be configured to run software to perform the method described herein in respect of the first entity 10. The software may be containerised according to some embodiments. Thus, in some embodiments, the processing circuitry 12 may be configured to run a container to perform the method described herein in respect of the first entity 10.

Briefly, the processing circuitry 12 of the first entity 10 is configured to train a plurality of machine learning models on the plurality of data inputs. Each machine learning model of the plurality of machine learning models is trained to generate a representation of at least one data input of the plurality of data inputs. The processing circuitry 12 of the first entity 10 is also configured to generate a representation of each data input of the plurality of data inputs using at least one trained machine learning model of the plurality of trained machine learning models. The plurality of trained machine learning models and the generated representation of each data input are for use in resolving an issue in the network.

As illustrated in FIG. 2, in some embodiments, the first entity 10 may optionally comprise a memory 14. The memory 14 of the first entity 10 can comprise a volatile memory or a non-volatile memory. In some embodiments, the memory 14 of the first entity 10 may comprise a non-transitory media. Examples of the memory 14 of the first entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first entity 10 can be connected to the memory 14 of the first entity 10. In some embodiments, the memory 14 of the first entity 10 may be for storing program code or instructions which, when executed by the processing circuitry 12 of the first entity 10, cause the first entity 10 to operate in the manner described herein in respect of the first entity 10. For example, in some embodiments, the memory 14 of the first entity 10 may be configured to store program code or instructions that can be executed by the processing circuitry 12 of the first entity 10 to cause the first entity 10 to operate in accordance with the method described herein in respect of the first entity 10. Alternatively or in addition, the memory 14 of the first entity 10 can be configured to store any information, data, messages, requests, responses, indications, notifications, signals, or similar, that are described herein. The processing circuitry 12 of the first entity 10 may be configured to control the memory 14 of the first entity 10 to store information, data, messages, requests, responses, indications, notifications, signals, or similar, that are described herein.

In some embodiments, as illustrated in FIG. 2, the first entity 10 may optionally comprise a communications interface 16. The communications interface 16 of the first entity 10 can be connected to the processing circuitry 12 of the first entity 10 and/or the memory 14 of first entity 10. The communications interface 16 of the first entity 10 may be operable to allow the processing circuitry 12 of the first entity 10 to communicate with the memory 14 of the first entity 10 and/or vice versa. Similarly, the communications interface 16 of the first entity 10 may be operable to allow the processing circuitry 12 of the first entity 10 to communicate with any one or more of the other entities (e.g. the second entity) referred to herein. The communications interface 16 of the first entity 10 can be configured to transmit and/or receive information, data, messages, requests, responses, indications, notifications, signals, or similar, that are described herein. In some embodiments, the processing circuitry 12 of the first entity 10 may be configured to control the communications interface 16 of the first entity 10 to transmit and/or receive information, data, messages, requests, responses, indications, notifications, signals, or similar, that are described herein.

Although the first entity 10 is illustrated in FIG. 2 as comprising a single memory 14, it will be appreciated that the first entity 10 may comprise at least one memory (i.e. a single memory or a plurality of memories) 14 that operate in the manner described herein. Similarly, although the first entity 10 is illustrated in FIG. 2 as comprising a single communications interface 16, it will be appreciated that the first entity 10 may comprise at least one communications interface (i.e. a single communications interface or a plurality of communications interface) 16 that operate in the manner described herein. It will also be appreciated that FIG. 2 only shows the components required to illustrate an embodiment of the first entity 10 and, in practical implementations, the first entity 10 may comprise additional or alternative components to those shown.

Figure 3:
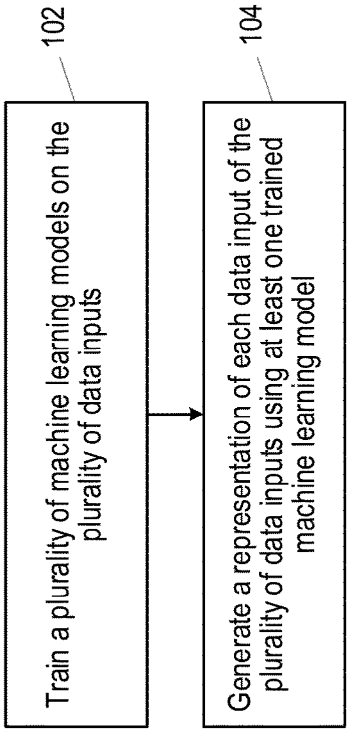
FIG. 3 is a flowchart illustrating a method performed by the first entity according to an embodiment.

FIG. 3 illustrates a first method performed by the first entity 10 in accordance with an embodiment. The first method is computer-implemented. The first method is for processing a plurality of data inputs comprising information about a network. The first entity 10 described earlier with reference to FIG. 2 can be configured to operate in accordance with the method of FIG. 3. The method can be performed by or under the control of the processing circuitry 12 of the first entity 10 according to some embodiments.

With reference to FIG. 3, as illustrated at block 102, a plurality of machine learning models is trained on the plurality of data inputs. Each machine learning model of the plurality of machine learning models is trained to generate a representation (e.g. an embedding) of at least one data input of the plurality of data inputs. As illustrated at block 104 of FIG. 3, a representation of each data input of the plurality of data inputs is generated using at least one trained machine learning model of the plurality of trained machine learning models. The plurality of trained machine learning models and the generated representation of each data input are for use in resolving an issue in the network. The plurality of (trained) machine learning models referred to herein may also be referred to as an ensemble of (trained) machine learning models.

The use of a machine learning model to generate an output can be referred to herein as inference. The plurality of machine learning models referred to herein can be any type of machine learning model. Examples of a machine learning model that can be used for one or more of the plurality of machine learning models referred to herein include, but are not limited to, a neural network (e.g. a deep neural network), a decision tree, or any other type of machine learning model.

In some embodiments, the plurality of data inputs referred to herein may comprise one or more data inputs in an unstructured format. Herein, an unstructured format can be a format that lacks a predefined (or recognisable) structure. Examples of a data input in an unstructured format include, but are not limited to, any type of informal data, such as a network service request (SR) or ticket, a log file, a trace file, and/or any other informal data. In some embodiments, the generated representation of each data input of the plurality of data inputs referred to herein may represent each data input of the plurality of data inputs in a structured format. Herein, a structured format can be a format that has a predefined (or recognisable) structure. Examples of a data input in a structured format include, but are not limited to, any type of formal data, such as network (e.g. product) documentation, and/or any other formal data.

In some embodiments, the plurality of data inputs referred to herein may comprise one or more data inputs obtained from a (e.g. historical) database or memory, such as the memory 14 of the first entity 10. In some embodiments, the plurality of data inputs referred to herein may comprise data inputs associated with issues in the network which have been previously resolved. For example, the plurality of data inputs referred to herein may comprise at least one previously resolved SR. Alternatively, or in addition, the plurality of data inputs referred to herein may comprise formal documentation, such as documentation of hardware comprised in the network. Although some examples have been provided for the type of data inputs comprised in the plurality of data inputs referred to herein, it will be understood that the plurality of data inputs referred to herein can comprise any data inputs, and any combination of data inputs, comprising information about the network.

In some embodiments, the generated representation of each data input may capture one or more relationships, such as one or more semantic relationships, in the data input. Herein, a semantic relationship can be any relationship between two or more words, e.g. based on the meaning of those words. For example, a semantic relationship may exist between technical terms (e.g. terms contained in structured technical documents) comprised in the one or more data inputs.

Although not illustrated in FIG. 3, in some embodiments, the first method may comprise analysing the plurality of data inputs to generate information about a plurality of nodes of the network. The first entity (e.g. the processing circuitry 12 of the first entity 10) can be configured to perform this analysis and generation according to some embodiments. The generated information about the plurality of nodes can be for use in resolving the issue. Although also not illustrated in FIG. 3, in some embodiments, the first method may comprise receiving feedback from a user following the use of the generated information about the plurality of nodes in resolving the issue. The first entity 10 (e.g. the processing circuitry 12 of the first entity 10) can be configured to receive this feedback (e.g. via a communications interface 16 of the first entity 10) according to some embodiments. In some embodiments, the method may comprise adapting, based on the received feedback, a subsequent analysis of the plurality of data inputs to generate updated information about the plurality of nodes of the network. The first entity 10 (e.g. the processing circuitry 12 of the first entity 10) can be configured to perform this adaptation of the subsequent analysis.

In some embodiments, the information about the plurality of nodes of the network may be generated in the form of a knowledge graph. A knowledge graph is a data structure used to organise (e.g. complex) data. A knowledge graph can be generated from a variety of data sources. A knowledge graph comprises nodes and edges. In some embodiments, each node of the knowledge graph may represent a node of the plurality of nodes of the network and each edge of the knowledge graph may represent a relationship between two nodes of the plurality of nodes of the network.

Herein, a node of the network can also be referred to as a network node. Examples of a network node include, but are not limited to, a server, an access point (e.g. a radio AP), a base station (e.g. a radio base station, a Node B, an evolved Node B (eNB), or a new radio (NR) NodeB (gNB)), and a data center.

Although not illustrated in FIG. 3, in some embodiments, the first method may comprise receiving feedback from a user following the use of the generated representation of each data input in resolving the issue. In some of these embodiments, the first method may comprise adapting, based on the received feedback, a weight assigned to the at least one trained machine learning model used to generate the representation of each data input. The first entity 10 (e.g. the processing circuitry 12 of the first entity 10) can be configured to receive this feedback and optionally also perform this weight adaptation according to some embodiments. The weight assigned to the at least one trained machine learning model can define a priority with which the at least one machine learning model is used relative to other machine learning models in a subsequent generation of the representation of each data input.

Although also not illustrated in FIG. 3, in some embodiments, the first method may comprise, in response to an update to the plurality of data inputs, retraining the plurality of machine learning models on the updated plurality of data inputs. The first entity 10 (e.g. the processing circuitry 12 of the first entity 10) can be configured to perform this retraining according to some embodiments.

Figure 4:
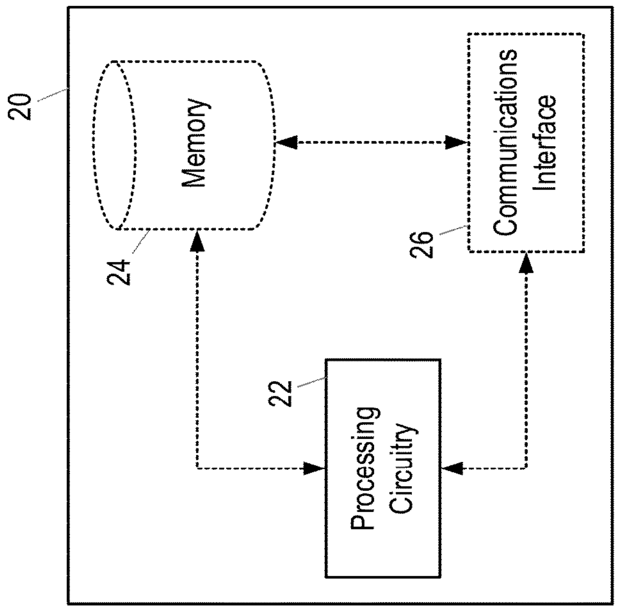
FIG. 4 is a block diagram illustrating a second entity according to an embodiment.

FIG. 4 illustrates a second entity 20 in accordance with an embodiment. The second entity 20 is for identifying one or more data inputs for use in resolving an issue in a network. The second entity 20 referred to herein can refer to equipment capable, configured, arranged and/or operable to communicate directly or indirectly with the first entity 10 referred to herein, and/or with other entities or equipment to enable and/or to perform the functionality described herein. The second entity 20 referred to herein may be a physical entity (e.g. a physical machine) or a virtual entity (e.g. a virtual machine, VM).

As illustrated in FIG. 4, the second entity 20 comprises processing circuitry (or logic) 22. The processing circuitry 22 controls the operation of the second entity 20 and can implement the method described herein in respect of the second entity 20. The processing circuitry 22 can be configured or programmed to control the second entity 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the second entity 20. In some embodiments, the processing circuitry 22 can be configured to run software to perform the method described herein in respect of the second entity 20. The software may be containerised according to some embodiments. Thus, in some embodiments, the processing circuitry 22 may be configured to run a container to perform the method described herein in respect of the second entity 20.

Briefly, the processing circuitry 22 of the second entity 20 is configured to, in response to receiving information about the issue in the network, generate a representation of the information about the issue using at least one trained machine learning model of a plurality of trained machine learning models. The processing circuitry 22 of the second entity 20 is also configured to identify one or more data inputs of a plurality of data inputs that are relevant to the issue based on the generated representation of the information about the issue. The one or more identified data inputs are for use in resolving the issue.

As illustrated in FIG. 4, in some embodiments, the second entity 20 may optionally comprise a memory 24. The memory 24 of the second entity 20 can comprise a volatile memory or a non-volatile memory. In some embodiments, the memory 24 of the second entity 20 may comprise a non-transitory media. Examples of the memory 24 of the second entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second entity 20 can be connected to the memory 24 of the second entity 20. In some embodiments, the memory 24 of the second entity 20 may be for storing program code or instructions which, when executed by the processing circuitry 22 of the second entity 20, cause the second entity 20 to operate in the manner described herein in respect of the second entity 20. For example, in some embodiments, the memory 24 of the second entity 20 may be configured to store program code or instructions that can be executed by the processing circuitry 22 of the second entity 20 to cause the second entity 20 to operate in accordance with the method described herein in respect of the second entity 20. Alternatively or in addition, the memory 24 of the second entity 20 can be configured to store any information, data, messages, requests, responses, indications, notifications, signals, or similar, that are described herein. The processing circuitry 22 of the second entity 20 may be configured to control the memory 24 of the second entity 20 to store information, data, messages, requests, responses, indications, notifications, signals, or similar, that are described herein.

In some embodiments, as illustrated in FIG. 4, the second entity 20 may optionally comprise a communications interface 26. The communications interface 26 of the second entity 20 can be connected to the processing circuitry 22 of the second entity 20 and/or the memory 24 of second entity 20. The communications interface 26 of the second entity 20 may be operable to allow the processing circuitry 22 of the second entity 20 to communicate with the memory 24 of the second entity 20 and/or vice versa. Similarly, the communications interface 26 of the second entity 20 may be operable to allow the processing circuitry 22 of the second entity 20 to communicate with any one or more of the other entities (e.g. the first entity 10) referred to herein. The communications interface 26 of the second entity 20 can be configured to transmit and/or receive information, data, messages, requests, responses, indications, notifications, signals, or similar, that are described herein. In some embodiments, the processing circuitry 22 of the second entity 20 may be configured to control the communications interface 26 of the second entity 20 to transmit and/or receive information, data, messages, requests, responses, indications, notifications, signals, or similar, that are described herein.

Although the second entity 20 is illustrated in FIG. 4 as comprising a single memory 24, it will be appreciated that the second entity 20 may comprise at least one memory (i.e. a single memory or a plurality of memories) 24 that operate in the manner described herein. Similarly, although the second entity 20 is illustrated in FIG. 4 as comprising a single communications interface 26, it will be appreciated that the second entity 20 may comprise at least one communications interface (i.e. a single communications interface or a plurality of communications interface) 26 that operate in the manner described herein. It will also be appreciated that FIG. 4 only shows the components required to illustrate an embodiment of the second entity 20 and, in practical implementations, the second entity 20 may comprise additional or alternative components to those shown.

Figure 5:
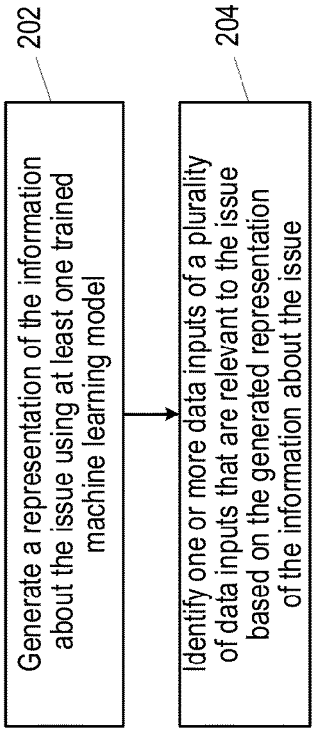
FIG. 5 is a flowchart illustrating a method performed by the second entity according to an embodiment.

FIG. 5 illustrates a second method performed by a second entity 20 in accordance with an embodiment. The second method is computer-implemented. The second method is for identifying one or more data inputs for use in resolving an issue in a network. The second entity 20 described earlier with reference to FIG. 4 can be configured to operate in accordance with the second method of FIG. 5. The second method can be performed by or under the control of the processing circuitry 22 of the second entity 20 according to some embodiments.

With reference to FIG. 5, as illustrated at block 202, in response to receiving information about the issue in the network, a representation (e.g. an embedding) of the information about the issue in the network is generated using at least one trained machine learning model of a plurality of trained machine learning models.

As illustrated at block 204 of FIG. 5, one or more data inputs of a plurality of data inputs that are relevant (e.g. pertinent) to the issue are identified based on the generated representation of the information about the issue. The one or more identified data inputs are for use in resolving the issue.

Although not illustrated in FIG. 5, in some embodiments, the second method may comprise receiving the information about the issue in the network. The second entity 20 (e.g. the processing circuitry 22 of the second entity 20) can be configured to receive this information (e.g. via a communications interface 26 of the second entity 20) according to some embodiments. In some embodiments, the received information about the issue may comprise information in an unstructured format. In some embodiments, the generated representation of the information about the issue may represent the information in a structured format. In some embodiments, the generated representation of the information about the issue may capture one or more relationships, such as one or more semantic relationships, in the information about the issue.

Although not illustrated in FIG. 5, in some embodiments, the second method may comprise acquiring information about one or more nodes of a plurality of nodes of the network that are mentioned in the information about the issue. The acquired information about the one or more nodes may be for use in resolving the issue. In some embodiments, the information about one or more nodes of the plurality of nodes of the network may be acquired from a knowledge graph. Each node of the knowledge graph can represent a node of the plurality of nodes of the network and each edge of the knowledge graph can represent a relationship between two nodes of the plurality of nodes of the network.

Although not illustrated in FIG. 5, in some embodiments, the second method may comprise receiving feedback from a user following the use of the one or more identified data inputs in resolving the issue. In some of these embodiments, the second method may comprise adapting, based on the received feedback, a weight assigned to the at least one trained machine learning model used to generate the representation of the information about the issue. The second entity 20 (e.g. the processing circuitry 22 of the second entity 20) can be configured to receive this feedback and optionally also perform this weight adaptation according to some embodiments. The weight assigned to the at least one trained machine learning model can define a priority with which the at least one machine learning model is used relative to other machine learning models in a subsequent generation of the representation of information about the issue.

In some embodiments, identifying one or more data inputs of a plurality of data inputs that are relevant to the issue based on the generated representation of the information about the issue may comprise comparing the generated representation of the information about the issue to a representation of each data input of the plurality of data inputs generated using at least one trained machine learning model of the plurality of trained machine learning models and identifying one or more data inputs of the plurality of data inputs that are relevant to the issue based on the comparison. In some of these embodiments, identifying one or more data inputs of the plurality of data inputs that are relevant to the issue based on the comparison may comprise determining, based on the comparison, at least one similarity metric between the generated representation of the information about the issue and the generated representation of each data input and identifying one or more data inputs of the plurality of data inputs that are relevant to the issue based on the at least one determined similarity metric. In some embodiments, the one or more data inputs identified based on the at least one determined similarity metric may be the one or more data inputs for which the determined similarity metric exceeds a predefined threshold. The at least one similarity metric referred to herein can be defined as a metric indicative of a degree of similarity between the generated representation of the information about the issue and the generated representation of each data input. An example of such a similarity metric is a similarity score but other similarity metrics can also be used.

Although not illustrated in FIG. 5, in some embodiments, the second method may comprise determining, based on the comparison, a plurality of different similarity metrics between the generated representation of the information about the issue and the generated representation of each data input. In some of these embodiments, the second method may also comprise identifying one or more data inputs of the plurality of data inputs that are relevant to the issue based on the determined plurality of different similarity metrics. The second entity 20 (e.g. the processing circuitry 22 of the second entity 20) can be configured to perform this determination and optionally also perform this identification according to some embodiments. In some embodiments, the second method may comprise receiving feedback from a user following the use of the one or more identified data inputs in resolving the issue. In some of these embodiments, the second method may comprise adapting, based on the received feedback, a weight assigned to each similarity metric of the plurality of different similarity metrics. The second entity 20 (e.g. the processing circuitry 22 of the second entity 20) can be configured to receive this feedback and optionally also perform this weight adaptation according to some embodiments. The weight assigned to each similarity metric of the plurality of different similarity metrics can define a priority with which the similarity metric is determined relative to other similarity metrics in a subsequent determination of at least one similarity metric between the generated representation of information about the issue in the network and the generated representation of each data input.

There is also provided a system comprising the first entity 10 described herein and the second entity 20 described herein. A computer-implemented method performed by the system comprises the method described herein in respect of the first entity 10 and the method described herein in respect of the second entity 20.

Figure 6:
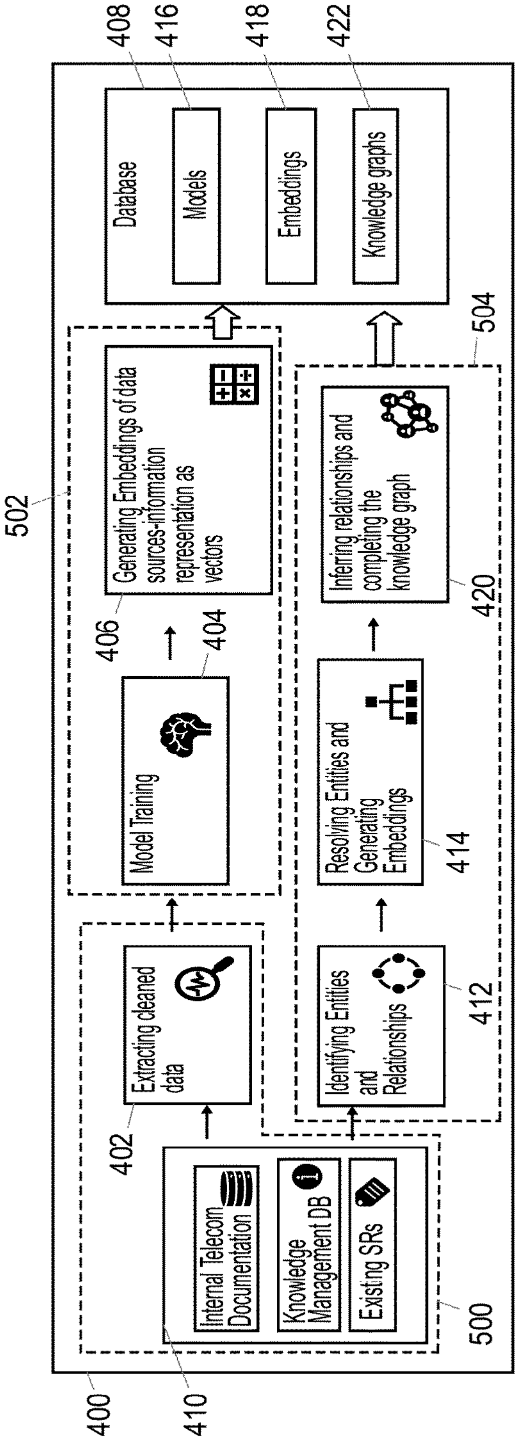
FIGS. 6-8 are schematic illustrations of a system according to some embodiments.

FIG. 6 illustrates a system 400 according to some embodiments. In FIG. 6, the system 400 comprises a data source and ingestion pipeline 500, an AI driven recommendation engine 502, a knowledge representation and recommendation engine 504, and a database 408. The system 400 can be referred to herein as a training system. In some embodiments, the system 400 can be a single module, which may be referred to as a training module (TM). In FIG. 6, although the data source and ingestion pipeline 500, the AI driven recommendation engine 502, the knowledge representation and recommendation engine 504, and the database 408 are illustrated as components being comprised in the same module, it will be understood that one or more of these components can be comprised in different modules according to other embodiments.

Although not illustrated in FIG. 6, in some embodiments, the first entity 10 (or the processing circuitry 12 of the first entity 10) described herein may comprise one or more of the data source and ingestion pipeline 500, the AI driven recommendation engine 502, the knowledge representation and recommendation engine 504, and the database 408. Thus, the steps described with reference to any one or more of these components 500, 502, 504, 408 can also be said to be performed by the first entity 10 (e.g. the processing circuitry 12 of the first entity 10). In some embodiments, the first entity 10 (or the processing circuitry 12 of the first entity 10) described herein may comprise the data source and ingestion pipeline 500, the AI driven recommendation engine 502, and the knowledge representation and recommendation engine 504, whereas the database 408 may be comprised in a different entity (e.g. the second entity 20 as described herein). In some embodiments, the AI driven recommendation engine 502 can be configured to perform the training of a plurality of machine learning models as described herein (e.g. with reference to step 102 of FIG. 3) and the generation of the representation of each data input of the plurality of data inputs as described herein (e.g. with reference to step 104 of FIG. 3).

The system 400 illustrated in FIG. 6 can be used in many situations. For example, the system 400 illustrated in FIG. 6 can be used to process data in order to enable improved automation of issue resolution in a (e.g. telecommunications) network. Issue resolution in a network, as referred to herein, may refer to the resolution of a service request (SR) or ticket raised in the network according to some embodiments.

In some embodiments, the data source and ingestion pipeline 500 may be configured to acquire a plurality of data inputs 410. The plurality of data inputs 410 comprise information about the network. The plurality of data inputs 410 can be acquired from a network, such as a telecommunications network. In some embodiments, the plurality of data inputs 410 may be acquired from one or more network entities (or nodes) and/or a memory (e.g. a database). In some embodiments, the plurality of data inputs 410 may be acquired from the same data source. In other embodiments, at least one of the plurality of data inputs 410 may be acquired from a different data source. In some embodiments, the plurality of inputs 410 may be acquired in advance to create a knowledge base. The (e.g. all in one) knowledge base that comprises the plurality of data inputs 410 can assist in resolving an issue in the network. Generally, one of the biggest challenges of resolving an issue in a network is collecting enough information about the issue and finding the root cause. The techniques described herein can aid in overcoming these challenges, whilst also reducing the overall resolution time.

In some embodiments, the plurality of data inputs 410 may comprise one or more data inputs in an unstructured format. As illustrated in FIG. 6, in some embodiments, the plurality of data inputs 410 may comprise (e.g. telecommunication) network documentation, knowledge management database data, and/or existing service requests (SRs). It will be understood that the plurality of data inputs 410 can comprise one or more of these example types of data and/or different types of data inputs comprising information about the network, such as software documentation. The existing SRs, as referred to herein, may refer to SRs that have been previously raised and/or resolved in the network. The plurality of data inputs 410 can be used to help resolve a newly raised SR in the network.

In some embodiments, the network documentation, as mentioned above, can comprise product documentation. The product documentation may, for example, refer to documentation associated with (e.g. about) one or more network entities or nodes, such as one or more base stations and/or one or more user equipments (UEs). For example, network entities or nodes can typically be associated with detailed documentation. In some examples, the network documentation may describe the operation and/or maintenance of a network entity or node associated with the documentation. The network documentation can be provided in a variety of ways, such as in the form of portable document format (PDF) files, hypertext markup language (HTML) files, and/or text documents. A network entity or node may be associated with one or more types of network documentation. In some embodiments, one or more parsers may be used to capture information from the plurality of data inputs 410, thereby preparing the plurality of data inputs 410 for ingestion by the plurality of machine learning models.

The knowledge management database, as mentioned above, can comprise information about network events. For example, in some embodiments, the information may be indicative of an issue (e.g. fault) in the network and/or one or more symptoms of that issue. In some embodiments, the issue in the network may be a known issue (e.g. the cause of the issue may be known). In some embodiments, the issue in the network may be a common issue (e.g. an issue that has occurred previously in the network). The knowledge management database may comprise information that indicates how to resolve the issue in the network. For example, the knowledge management database may comprise information indicative of troubleshooting techniques in the network. Therefore, the plurality of data inputs 410 (e.g. data from the knowledge management database) can be used to quickly understand and resolve an issue (e.g. identified in an SR) in the network. In some embodiments, the plurality of data inputs 410 can comprise data that is indicative of how issues similar to the current issue in the network have been resolved. In this way, the plurality of data inputs 410 can help (e.g. a network user) to take quick action to resolve an issue by finding similar known issues.

The existing SRs, as mentioned above, can be obtained from a memory (e.g. a database). Although FIG. 6 illustrates a plurality of existing SRs, it will be understood that the existing SRs may comprise one or more existing SRs. In some embodiments, the existing SRs can comprise data indicative of previous SRs which have been raised (or created) in the network. For example, the existing SRs may comprise data indicative of historical SRs in the network. An SR, as referred to herein, may also be referred to as a ticket.

In some embodiments, an existing SR may be associated with an SR that has previously been raised by a user of the network. In some embodiments, the existing SR may comprise information indicative of a solution to an issue which has been previously resolved in the network. Therefore, it is possible to reuse solutions from similar issues in the past, which can reduce the overall time and effort needed to resolve the issue in the network.

As illustrated at block 402 of FIG. 6, in some embodiments, the data source and ingestion pipeline 500 may be configured to process (or, more specifically, pre-process) the plurality of data inputs 410. The processing of the plurality of data inputs 410 at block 402 of FIG. 6 can comprise cleaning the plurality of data inputs 410. For example, in some embodiments, the data source and ingestion pipeline 500 can be configured to extract cleaned data from the plurality of data inputs 410. The processing of the plurality of data inputs 410 at block 402 of FIG. 6 can comprise a variety of techniques, such as scraper, parsing and/or extraction techniques. These techniques can be applied to integrate the knowledge base that comprises the plurality of data inputs 410 into the recommendation pipeline. The processing of the plurality of data inputs 410 at block 402 of FIG. 6 can be performed in order to convert the plurality of data inputs 410 into a format suitable for input into the AI driven recommendation engine 502 or, more specifically, a plurality of machine learning models at the AI driven recommendation engine 502.

In some embodiments, the plurality of data inputs 410 may comprise text. For example, the plurality of data inputs 410 may comprise documentation (e.g. in the case of a telecommunications or wireless telecommunications network domain), such as product documentation and that documentation can comprise text. In some embodiments where the plurality of data inputs 410 comprise text, the text can comprise acronyms. For example, acronyms are common in the (e.g. wireless) telecommunication network domain. In order for text comprising acronyms to be converted into a form which is suitable for input into a machine learning model, it is beneficial to process such text in order to replace the acronyms with the full expression (e.g. name) defined by the acronym (e.g. the replacement of an acronym "abb" with the full expression "antenna building block"). Therefore, in some embodiments, a technique used for processing the plurality of data inputs 410 at block 402 of FIG. 6 can comprise acronym replacement. In some embodiments, the acronym replacement technique can be performed using a database of acronyms and their associated full expressions. For example, the database may comprise information associated with one or more glossaries, such as those found in network product documentation. The acronym replacement strategy can allow data inputs (e.g. documents) to be matched more accurately.

Alternatively or in addition, in some embodiments, the processing of the plurality of data inputs 410 at block 402 of FIG. 6 may comprise performing a spell check technique on the plurality of data inputs. For example, spelling mistakes made by users in the plurality of data inputs 410 (e.g. where the plurality of data inputs 410 comprise an SR) may be corrected by applying a spell check technique to the plurality of data inputs 410. In some network domains (e.g. the telecommunications domain), common spell check techniques do not cope well with the technical language that can be found in network documentation. While common spell check techniques may correct some spelling errors, they can be slow due to their large vocabulary and they can also introduce noise into the plurality of data inputs 410 through incorrect corrections. For example, common spell check techniques applied to network documentation may incorrectly correct an abbreviation into a completely unrelated word. Therefore, in some embodiments, a customised spell check may be used. In particular, the spell check technique referred to herein may involve checking the spelling of the plurality of data inputs against a selection (or index) of data associated with the particular domain from which the plurality of data inputs 410 are acquired. For example, the selection of data can comprise words that are often misspelled by users of the network, such as words that are often misspelled by SR agents. The customised spell check technique can enable faster word retrieval and can also avoid introducing noise into the plurality of data inputs 410.

Alternatively or in addition, in some embodiments, the processing of the plurality of data inputs 410 at block 402 of FIG. 6 may comprise extracting information from the plurality of data inputs 410. For example, in some embodiments, the extraction may comprise regular expression-based information (or content) extraction. Generally, extracting useful information from informal text (e.g. in an SR) can be challenging. Therefore, in some embodiments, useful information can be extracted from the plurality of data inputs 410 by using one or more (e.g. a variety of) keywords and/or one or more (e.g. regular) expression patterns. Specifically, one or more (e.g. a variety of) keywords and/or one or more (e.g. regular) expression patterns can be used to extract key content from the plurality of data inputs 410 and/or to exclude irrelevant parts (e.g. e-mails, greetings, etc.) of the plurality of data inputs 410. In this way, the most useful information from the plurality of data inputs 410 can be input into the plurality of machine learning models and unwanted noise can be removed.

Alternatively or in addition, in some embodiments, the processing 402 of the plurality of data inputs 410 at block 402 of FIG. 6 may comprise applying one or more natural language processing (NLP) techniques to the plurality of data inputs 410. In some embodiments, such NLP techniques can comprise removing stop words from the plurality of data inputs 410 and/or lemmatisation of the plurality of data inputs (e.g. tokens).

Thus, using any one or more of the processing techniques described herein with reference to block 402 of FIG. 6, the plurality of data inputs can be converted into the most suitable form for ingestion by the plurality of machine learning models.

As illustrated in FIG. 6, the (e.g. processed or pre-processed) plurality of data inputs 410 can be input into the AI driven recommendation engine 502 or, more specifically, a plurality of machine learning models at the AI driven recommendation engine 502. As illustrated at block 404 of FIG. 6, the AI driven recommendation engine 502 trains the plurality of machine learning models on the plurality of data inputs 410. In some embodiments, each of the plurality of machine learning models may be trained using each of the plurality of data inputs 410. In some embodiments, in response to an update to the plurality of data inputs, the plurality of machine learning models may be retrained on the updated plurality of data inputs.

In some embodiments, some, or all, of the plurality of machine learning models may be trained on one or more of the plurality of data inputs 410. The one or more data inputs of the plurality of data inputs 410 used for training may be the same or different for each of the machine learning models. As mentioned earlier, the plurality of machine learning models referred to herein can also be referred to as an ensemble of machine learning models. Thus, the method performed by the AI driven recommendation engine 502 can be referred to herein as an ensemble modelling approach.

As illustrated at block 406 of FIG. 6, each machine learning model of the plurality of machine learning models is trained (at block 404 of FIG. 6) to generate a representation (e.g. an embedding) of at least one data input of the plurality of data inputs 410. In some embodiments, the generated representation 418 of each data input of the plurality of data inputs 410 represents each data input of the plurality of data inputs in a structured format. Different machine learning approaches may be adopted by one or more machine learning models of the plurality of machine learning models to generate the representations of the data inputs. For example, in some embodiments, each machine learning model of the plurality of machine learning models may generate a representation of each data input of the plurality of data inputs using a different machine learning technique. A generated representation of a data input can convert unstructured information in the data input into structured information. In some embodiments, the generated representations 418 of each data input of the plurality of data inputs 410 can comprise representations in vector form. In some embodiments, the generated representations can be embeddings. For example, in some embodiments, the generated representations 418 can be embeddings in vector space. In an example, the plurality of machine learning models may generate vector representations (e.g. embeddings) from information about the issue that comprises one or more network product documents, one or more network libraries, and/or one or more previously raised SRs in the network.

As illustrated at blocks 412 and 414 of FIG. 6, in some embodiments, the knowledge representation and recommendation engine 504 may analyse the plurality of data inputs 410. As illustrated at block 420 of FIG. 6, in some embodiments, the plurality of data inputs 410 may be analysed (at blocks 412 and 414 of FIG. 6) to generate information 422 about a plurality of nodes (or entities) of the network. In some embodiments, the generated information 422 about the plurality of nodes of the network may be generated in the form of a knowledge graph. In these embodiments, each node of the knowledge graph can represent a node of the plurality of nodes of the network and each edge of the knowledge graph can represent a relationship between two nodes of the plurality of nodes of the network. The generated information 422 about the plurality of nodes can be for use in resolving the issue in the network.

In more detail, at block 412 of FIG. 6, the knowledge representation and recommendation engine 504 may analyse the plurality of data inputs 410 to identify any nodes, and optionally also their relationships, mentioned in the plurality of data inputs 410. Thus, the generated information 422 about the plurality of nodes can comprise an indication of any identified nodes and optionally also their relationships according to some embodiments. At block 414 of FIG. 6, the knowledge representation and recommendation engine 504 may resolve any identified nodes, such as to eliminate any duplicates, and/or generate a representation (e.g. embedding) of the identified nodes and optionally also their relationships. At block 420 of FIG. 6, the knowledge representation and recommendation engine 504 may infer (e.g. further) relationships between the identified nodes and optionally also generate a knowledge graph comprising the generated information 422 about the plurality of nodes.

Therefore, a knowledge base can be generated using information available in the plurality of data inputs 410 (e.g. product documentation). For an active SR, for example, the knowledge base can be used to suggest relevant facts, configuration parameters, performance counters and dependencies that are relevant to the issue raised in the SR (e.g. for a problematic network node).

As illustrated at block 408 of FIG. 6, in some embodiments, any one or more of the plurality of trained machine learning models 416, any one or more of the generated representations (e.g. embeddings) 418, and/or the generated information (e.g. in the form of a knowledge graph) 422 may be stored in a memory (e.g. database), such as the memory 14 of the first entity 10 referred to herein.

Figure 7:
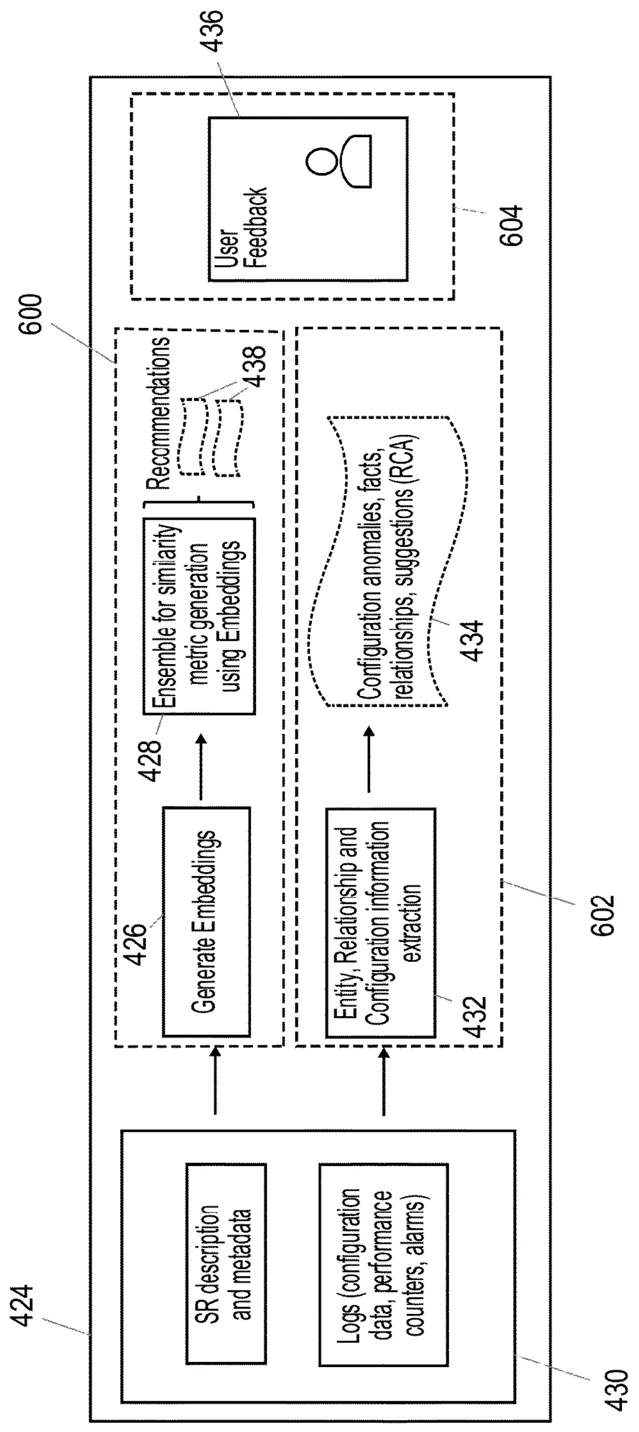

FIG. 7 illustrates a system 424 according to some embodiments. The system 424 can be referred to herein as an inference system. In some embodiments, the system 424 can be a single module, which may be referred to as an inference module (IM). In FIG. 7, the system 424 comprises an AI driven document recommendation engine 600, a knowledge representation and recommendation engine 602, and a feedback driven continuous learning engine 604. Although the AI driven document recommendation engine 600, the knowledge representation and recommendation engine 602, and the feedback driven continuous learning engine 604 are illustrated as components being comprised in the same module, it will be understood that one or more of these components can be comprised in different modules according to other embodiments.

Although not illustrated in FIG. 7, in some embodiments, the second entity 20 (or the processing circuitry 22 of the second entity 20) described herein may comprise one or more of the AI driven document recommendation engine 600, the knowledge representation and recommendation engine 602, and the feedback driven continuous learning engine 604. Thus, the steps described with reference to any one or more of these components 600, 602, 604 can also be said to be performed by the second entity 20 (or the processing circuitry 22 of the second entity 20).

The system illustrated in FIG. 7 can be used in many situations. The system of FIG. 7 is used for identifying one or more data inputs for use in resolving an issue in a network. The system of FIG. 7 can be used to help resolve an issue in a network with greater speed and reliability. In an example, the use of the system illustrated in FIG. 7 can help a CSA to efficiently resolve an SR (or ticket) raised by a user of the network.

As illustrated at block 430 of FIG. 7, information about the issue in the network is received. In some embodiments, the information about the issue in the network may comprise one or more SRs, metadata, one or more log files, configuration data, one or more performance measurement (PM) counters, alarm data, and/or any other type of information about the issue in the network. In some embodiments, an SR may comprise data in the form of free text, which is unstructured data. Therefore, in some embodiments, the information about the issue can comprise information in an unstructured format. In some embodiments, the information about the issue in the network may be populated by a network user. Some or all of the information may be associated with one or more network nodes. For example, in some embodiments, one or more log files comprised in the information may be associated with the performance of a node of the network. Although not illustrated in FIG. 7, the information may be obtained from one or more network nodes, and/or a memory (e.g. a database).

As illustrated in FIG. 7, the AI driven document recommendation engine 600 can receive the information about the issue in the network. Although not illustrated in FIG. 7, in some embodiments, the received information about the issue in the network may be pre-processed (e.g. cleaned), such as to convert it into a format that is suitable for input into a machine learning model. For example, in some embodiments, the received information may be processed to convert it into a numerical format. In some embodiments, the received information may alternatively or additionally undergo other pre-processing techniques, such as identification of key value pairs, regex matching (e.g. to exclude non-relevant parts of the information), keyword searches, and/or acronym resolution. These pre-processing techniques allow the technique described herein to reliably map the plurality of data inputs (e.g. SRs) to relevant documentation, e.g. product documentation.

In response to receiving the information about the issue in the network, as illustrated at block 426 of FIG. 7, the AI driven document recommendation engine 600 generates a representation of the information about the issue using at least one trained machine learning model of the plurality of trained machine learning models referred to herein. In some embodiments, the plurality of machine learning models can be as described earlier with reference to FIG. 6. In some embodiments, the generated representation of the information about the issue represents the information in a structured format. The generated representation of the information about the issue may capture one or more (e.g. semantic) relationships in the information about the issue, such as between one or more technical terms comprised in the information about the issue.

As illustrated at block 428 of FIG. 7, one or more data inputs of a plurality of data inputs that are relevant to the issue are identified based on the generated representation of the information about the issue. In some embodiments, the plurality of data inputs can be as described earlier with reference to FIG. 6. In some embodiments, the identifying at block 428 of FIG. 7 may comprise comparing the generated representation of the information about the issue to a representation of each data input of the plurality of data inputs generated using at least one trained machine learning model of the plurality of trained machine learning models, and identifying one or more data inputs of the plurality of data inputs that are relevant to the issue may be based on the comparison. The one or more identified data inputs 438 are for use in resolving the issue in the network. The one or more identified data inputs 438 may be those that are most relevant and/or similar to the information about the issue. For example, in some embodiments, the identifying at block 428 of FIG. 7 may comprise determining, based on the comparison, at least one similarity metric between the generated representation of the information about the issue and the generated representation of each data input and identifying one or more data inputs of the plurality of data inputs that are relevant to the issue are identified based on the at least one determined similarity metric. The one or more identified data inputs 438 can be referred to herein as one or more recommendations. For example, the one or more identified data inputs 438 can represent recommendations to be made to a user (e.g. a CSA) for use in resolving the issue in the network.

The identification of one or more data inputs that are relevant to the issue in the network can be referred to herein as mapping according to some embodiments. For example, in some embodiments, the AI driven document recommendation engine 600 may map the received information about the issue in the network to one or more data inputs of a plurality of data inputs that are identified as being relevant to the issue. Therefore, the method described herein allows mapping of information about an issue to one or more data inputs for use in resolving the issue. For example, an SR may be mapped to one or more data inputs that are relevant (e.g. pertinent) to an issue raised in the SR. More specifically, for example, text (e.g. informal text or unstructured free text) in an SR may be mapped to relevant network data, such as (e.g. formal) technical/product documentation, historical SRs, knowledge management databases, and/or similar. The mapping can be provided in a complex setting, where the contents of one SR can have multiple potentially relevant data inputs (e.g. documents/SRs) containing pertinent information to resolve the SR, and where it is not possible to have labelled training data to train machine learning models. The method described herein can ensure that only relevant contents are extracted from both the information about the issue (e.g. SRs) and the one or more data inputs and may use a combination of metrics and/or techniques to find the best match.

As illustrated in FIG. 7, the knowledge representation and recommendation engine 602 can receive the information about the issue in the network. This information may be pre-processed in the manner described earlier according to some embodiments. As illustrated at block 432 of FIG. 7, the knowledge representation and recommendation engine 602 may acquire information about one or more nodes of a plurality of nodes of the network that are mentioned in the information about the issue. Thus, the output 434 of the knowledge representation and recommendation engine 602 can be the acquired information about the one or more nodes. The acquired information about the one or more nodes can be for use in resolving the issue. In some embodiments, the acquired information about the one or more nodes may comprise information indicative of configuration exceptions, (e.g. potential) anomalies, facts, relationships, and/or recommendations associated with the one or more nodes.

In some embodiments, the acquisition of information about one or more nodes at block 432 of FIG. 7 may comprise extracting information about one or more nodes mentioned in the received information about the issue in the network (e.g. an SR). The received information about the issue in the network (e.g. SR) may have been created by a user, such as a CSA. In some embodiments, the information about the one or more nodes (e.g. mentioned in the received information about the issue) may be acquired from a knowledge graph. In these embodiments, each node of the knowledge graph may represent a node of the plurality of nodes of the network and each edge of the knowledge graph may represent a relationship between two nodes of the plurality of nodes of the network. A combination of the identified one or more nodes of the network and the knowledge graph can help in understanding and resolving the issue in the network. The acquired information about one or more nodes may be sent to a user for this purpose.

In some embodiments, the information about the issue in the network (e.g. data from one or more log files and/or configuration data) received at block 430 of FIG. 7 can be compared to data in the knowledge graph in order to acquire the information about one or more nodes for use in resolving the issue. Therefore, in some embodiments, the knowledge graph can be used to validate the information about the issue in the network, which is received at block 430 of FIG. 7. In some embodiments, logs can be used to extract relevant configuration information and validate settings against default or recommended settings from product documentation using the knowledge graph.

As illustrated at block 436 of FIG. 7, the feedback driven continuous learning engine 604 can acquire feedback from one or more users, e.g. one or more users of the network. In some embodiments, the feedback may comprise feedback on the use of the one or more identified data inputs 438 in resolving the issue. For example, the feedback may be indicative of how useful a user found the one or more identified data inputs 438 in resolving the issue. Although not illustrated in FIG. 7, in some embodiments, the feedback may be used to adapt one or more of the plurality of trained machine learning models. For example, machine learning model parameters (e.g. hyperparameters) and/or similarity parameters used in one or more of the plurality of the trained machine learning models may be fine-tuned using the feedback. In some embodiments, the feedback may be continuously obtained. In this way, the ensemble of machine learning models can be continually updated in order to provide more accurate identification of one or more data inputs. The feedback-driven approach allows the technique described herein to adapt to improve through user feedback over time.

Figure 8:
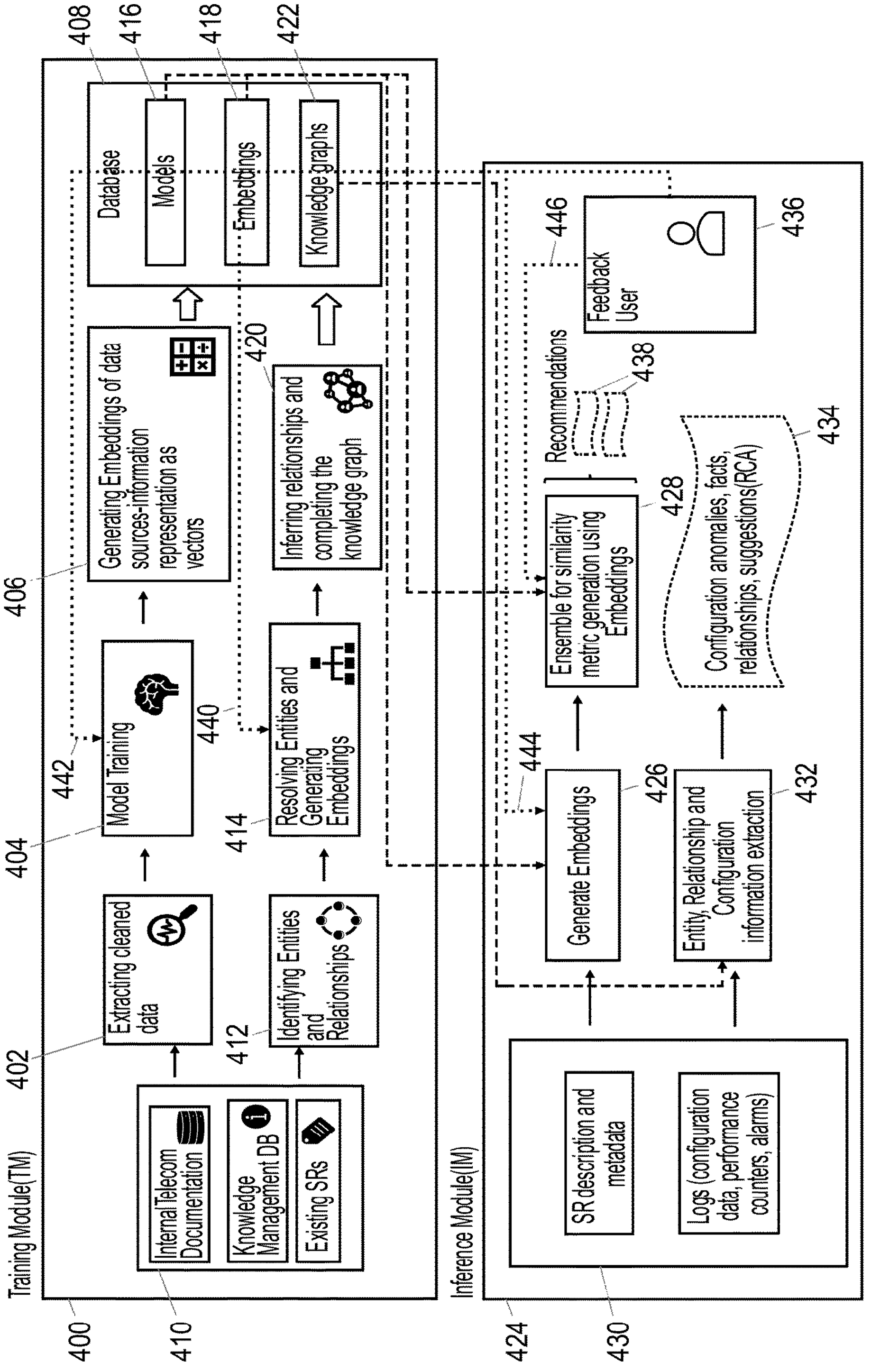

FIG. 8 illustrates a system according to some embodiments. The system illustrated in FIG. 8 comprises a first system, which is as described earlier with reference to FIG. 6, and a second system 424, which is as described earlier with reference to FIG. 7. A manner in which these two systems 400, 424 can interact is illustrated in FIG. 8. The system illustrated in FIG. 8 can process a plurality of data inputs and identify one or more data inputs for use in resolving an issue in a network. More specifically, for example, the system illustrated in FIG. 8 can be used for information retrieval in a (e.g. telecommunications) network domain in order to map information about the issue in the network (e.g. information comprised in an SR, which can be used to raise such issues) to one or more data inputs (e.g. one or more technical documents) for use in resolving the issue in the network. For example, the system illustrated in FIG. 8 can map informal data (e.g. log files associated with an SR) to formal data (e.g. product documentation).

In some embodiments, the first entity 10 (or the processing circuitry 12 of the first entity 10) described herein may be configured to perform the steps described with reference to the first system 400. In some embodiments, the second entity 20 (or the processing circuitry 22 of the second entity 20) described herein may be configured to perform the steps described with reference to the second system 424. However, it will be understood that this is merely one example and the first entity (or the processing circuitry 12 of the first entity 10) and/or the second entity 20 (or the processing circuitry 22 of the second entity 20) described herein may be configured to perform any one or more of the steps described with reference to the system illustrated in FIG. 8.

In some embodiments, the first system 400 may be configured to operate in an offline mode. Thus, in some embodiments, the steps performed by the first system 400 can be performed offline. In some embodiments, the second system 424 may be configured to operate in an online mode. Thus, in some embodiments, the steps performed by the second system 424 can be performed online.

As illustrated in FIG. 8, in some embodiments, the first system 400 and the second system 424 can communicate with each other. The first system 400 and the second system 424 may communicate in order to establish a feedback mechanism between the two systems. As illustrated at block 436 of FIG. 8 and the arrows therefrom, in some embodiments, feedback can be provided to one or both of the first system 400 and the second system 424. In some embodiments involving feedback, the feedback may be stored in a memory, such as a memory of the second system 424. In some embodiments, the second system 424 may be configured to expose an application program interface (API) to obtain the feedback. The feedback can be from one or more users, e.g. one or more users of the network.

The feedback may comprise feedback on the use of one or more identified data inputs 438 in resolving an issue in the network. For example, the feedback may be indicative of how useful a user found the one or more identified data inputs 438 in resolving the issue. The use of feedback can allow the plurality of machine learning models to adapt themselves to domain specific tasks according to some embodiments. In some embodiments, the feedback can provide information on which of the one or more machine learning models of the plurality of machine learning models generates the most accurate and/or reliable representation of a data input. In some embodiments, the feedback can be indicative of which machine learning model is best suited to generating representations of data inputs from a particular data source. In this way, the methods described herein can be adapted to process data inputs from an array of different data sources (e.g. from different network domains) without needing to examine the performance of individual machine learning approaches with regard to the different data sources.

As mentioned earlier, feedback can be provided to one or both of the first system 400 and the second system 424 according to some embodiments. The use of feedback can enable the steps performed by the systems 400, 424 to be adaptive. In some embodiments, the systems 400, 424 can continuously learn on the go using the feedback. In some embodiments, parameters (e.g. hyperparameters) of one or more of the plurality of machine learning models can be optimised using the feedback.

As illustrated by arrow 440 of FIG. 8, in some embodiments, the first system 400 may receive feedback following the use of the generated information 422 about the plurality of nodes in resolving the issue in the network. In some of these embodiments, the first system 400 may adapt, based on the received feedback, a subsequent analysis of the plurality of data inputs 410 (at block 414 of FIG. 8) to generate updated information about the plurality of nodes of the network (at block 420 of FIG. 8).

As illustrated by arrow 442 of FIG. 8, in some embodiments, the first system 400 may receive feedback following the use of the generated representation 418 of each data input in resolving the issue. In some of these embodiments, the first system 400 may adapt, based on the received feedback, a weight assigned to the at least one trained machine learning model used (at block 404 of FIG. 8) to generate the representation 418 of each data input (at block 406 of FIG. 8). The weight assigned to the at least one trained machine learning model can define a priority with which the at least one machine learning model is used relative to other machine learning models in a subsequent generation of the representation of each data input (at block 404 of FIG. 8).

As illustrated by arrow 444 of FIG. 8, in some embodiments, the second system 424 may receive feedback following the use of the one or more identified data inputs 438 in resolving the issue. In some of these embodiments, the second system 424 may be configured to adapt, based on the received feedback, a weight assigned to the at least one trained machine learning model used (at block 426 of FIG. 8) to generate the representation of the information 430 about the issue (at block 428 of FIG. 8). The weight assigned to the at least one trained machine learning model can define a priority with which the at least one machine learning model is used relative to other machine learning models in a subsequent generation of the representation of information about the issue (at block 428 of FIG. 8).

As illustrated by arrow 446 of FIG. 8, in some embodiments, the second system 424 may receive feedback following the use of the one or more identified data inputs 438 in resolving the issue. In some of these embodiments, the second system 424 may adapt, based on the received feedback, a weight assigned to each similarity metric of the plurality of different similarity metrics described earlier (at block 428 of FIG. 8). The weight assigned to each similarity metric of the plurality of different similarity metrics can define a priority with which the similarity metric is determined relative to other similarity metrics in a subsequent determination of at least one similarity metric between the generated representation of information about the issue in the network and the generated representation of each data input (at block 428 of FIG. 8).

By using a feedback driven process as described with reference to FIG. 8, it can be ensured that the system (e.g. any one or more of the AI driven recommendation engine 502 of the first system 400, the knowledge representation and recommendation engine 504 of the first system 400, the AI driven document recommendation engine 600 of the second system 424, and the knowledge representation and recommendation engine 602 of the second system 424) can be fine-tuned and improved over time. The issue in the network can be resolved faster and more reliably by adapting the method steps based on feedback. For example, feedback may be obtained from experts (e.g. in real-time) who are solving new service requests in the (e.g. telecommunications) network.

In the manner described herein, during a training phase, different machine learning approaches can be adopted to convert data inputs into (e.g. vector) representations (or embeddings) that capture the (e.g. linguistic) representation of the data inputs. To augment the issue resolution, a knowledge graph can also be created (e.g. from internal network documentation), which can summarise the facts, relationships, and/or dependencies of different nodes of the network.

Also, in the manner described herein, during an inference phase, trained machine learning models, representations (or embeddings), and a knowledge graph can be used to find the most relevant (e.g. most similar) data inputs from each data source that can act as a reference for solving a particular issue in the network. For example, as described herein, the most relevant data inputs may be found by comparing the information about (e.g. text describing) the issue to the (e.g. texts of) documentation.

Figure 9:
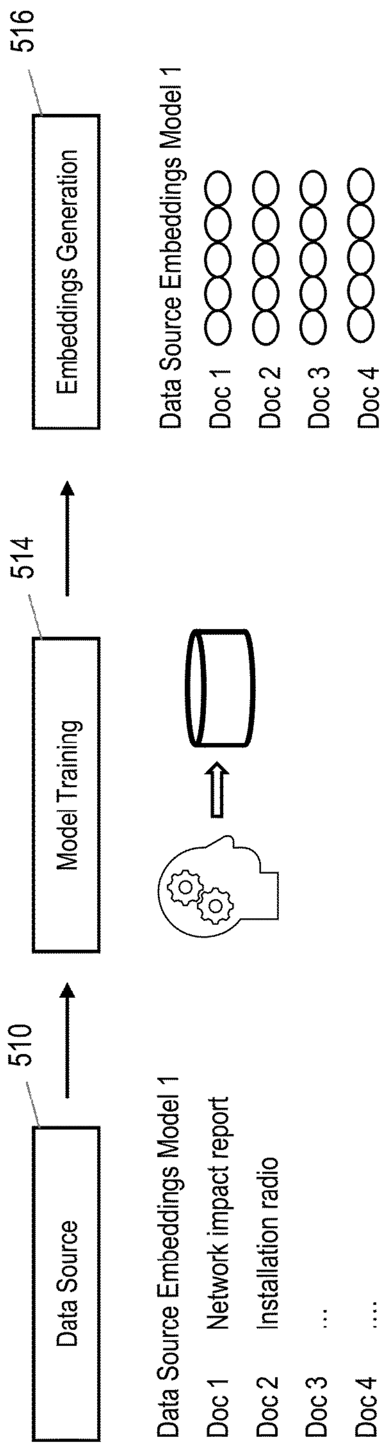
FIGS. 9 and 10 are schematic illustrations of methods performed according to some embodiments.

FIG. 9 illustrates an example method for processing a plurality of data inputs comprising information about a network. More specifically, FIG. 9 illustrates an example of how the plurality of data inputs can be processed to generate a representation of each data input of the plurality of data inputs. The method illustrated in FIG. 9 can be performed by the first entity 10 (e.g. the processing circuitry 12 of the first entity 10) described herein according to some embodiments.

As illustrated at block 510 of FIG. 9, a plurality of data inputs (e.g. from one or more data sources) are input into a plurality of machine learning models. Although FIG. 9 shows the plurality of data inputs as comprising network documentation (e.g. “Doc 1”, “Doc 2”, “Doc 3”, and “Doc 4”), it will be understood that the plurality of data inputs may comprise any other type of data input, and any combination of types of data input, comprising information about the network.

As illustrated at block 514 of FIG. 9, the plurality of machine learning models are trained on the plurality of data inputs. Each machine learning model of the plurality of machine learning models is trained to generate a representation of at least one data input of the plurality of data inputs. Thus, as illustrated at block 516 of FIG. 9, a representation of at least one data input of the plurality of data inputs is generated. The plurality of trained machine learning models and the generated representation of each data input are for use in resolving an issue in the network.

In some embodiments, one or more machine learning models of the plurality of machine learning models may use language modelling to generate the representation of each data input of the plurality of data inputs 510. For example, in some embodiments, one or more machines learning models of the plurality of machine learning models may use language modelling to capture (e.g. latent) knowledge from the plurality of data inputs 510 in the generated representation of each data input. The plurality of machine learning models can focus on different aspects of the plurality of data inputs, such as a frequency of a data item (e.g. a term) in the plurality of data inputs, a feature in the plurality of data inputs (e.g. detected using salient feature recognition), temporal information in the plurality of data inputs, and/or any other aspects of the plurality of data inputs. The plurality of machine learning models can comprise any one or more of a term frequency-inverse document frequency (TF-IDF) model, a doc2vec model, a word2vec model, a multi-layer perception (MLP) model, a long short-term memory (LSTM) model, and a (e.g. fine-tuned) Bert model. However, it will be understood that the plurality of machine learning models can comprise any other type(s) of machine learning model and any combination of machine learning models.

In some embodiments, a weight may be assigned to at least one of the plurality of trained machine learning models based on feedback received from a user. The weight assigned to the at least one trained machine learning model can define a priority with which the at least one machine learning model is used relative to other machine learning models in a subsequent generation of the representation of each data input. Thus, the impact of each machine learning model of the plurality of machine learning models can be defined by weights which are assigned using user feedback. In some embodiments, a larger assigned weight may correspond to a higher priority than a lower assigned weight.

In some embodiments, the weights assigned to each machine learning model of the plurality of machine learning models may depend on the nature (e.g. characteristics) of the data comprised in the plurality of data inputs. For example, for data inputs comprising information from a (e.g. historical) database of resolved SRs, a simpler machine learning model (e.g. TF-IDF, doc2vec, word2vec etc.) may be assigned a higher weight than a more complex (e.g. deeper) machine learning model. This may be because the data inputs associated with resolved SRs comprise unstructured data (e.g. no structured representation of text), and therefore a model which focusses on keywords and word frequency will often perform more effectively than a complex model. Thus, a simpler model may be more effective at providing a representation of such a data input for use in resolving an issue in the network. On the other hand, in some embodiments, for structured data inputs (such as formal documentation, e.g. of network hardware), a more complex (e.g. deeper) machine learning model (e.g. MLP, LSTM, fine-tuned Bert model etc.) may be assigned a higher weight than a simpler model. These more complex (e.g. deeper) machine learning models may, for example, be able to capture a latent meaning of a context comprised in the plurality of data inputs. Therefore, a more complex (e.g. deeper) machine learning model may perform more effectively in generating representations of more structured data inputs for resolving an issue in the network.

In some embodiments, the weight assigned to at least one (e.g. each) machine learning model of the plurality of machine learning models may be pre-assigned. In some embodiments, the weight assigned to at least one (e.g. each) machine learning model may be randomly assigned. In some embodiments, the weight assigned to at least one (e.g. each) machine learning model may be based on the type of network for which the issue is to be resolved.

The parameters (e.g. hyperparameters) of at least one (e.g. each) machine learning model of the plurality of machine learning models may be optimised using user feedback. This optimisation can provide a framework that works for any kind of data inputs and/or any kind of domain. Specifically, the method can be a purely data driven approach by way of the optimisation.

In general, out-of-the-box pre-trained machine learning models yield poor results when applied to a complex network domain, such as a telecommunications network domain. This is primarily down to pre-trained machine learning models having been trained extensively on a large corpus of training data that has very few domain specific (e.g. telecommunications related) documents. Moreover, the training data used to train these machine learning models has to be publicly available, whereas most product documentation is proprietary and not shared publicly. As a result, terms encountered in data inputs (such as SRs and product documentation, e.g. in the case of a telecommunications network) are seldom part of the training data for pre-trained machine learning models, resulting in relatively poor results.

In addition, most pre-trained machine learning models have a limit on input size. In some practical cases for resolving an issue in a network, it may be useful to compare a raised issue (e.g. an issue raised by a customer) that comprises a small amount of data (e.g. only a few sentences/phrases) to more formal documentation that comprises a much larger amount of data. The level of padding or truncation required to make a pre-trained machine learning model work often impacts the performance of the machine learning model. Therefore, in some embodiments, the plurality of machine learning models referred to herein may comprise a combination of one or more complex machine learning models with one or more standard machine learning models. In this way, the power of extensively trained machine learning models can be utilised without compromising results due to the mentioned constraints. As described above, the weights assigned to at least one (e.g. each) machine learning model of the plurality of machine learning models can determine the impact of the at least one machine learning model, which makes the technique universal for any kind of data inputs.

In some embodiments, the plurality of machine learning models referred to herein may capture salient features of the plurality of data inputs (e.g. documentation) in the generated representation of the plurality of data inputs. In some embodiments (such as those in which the plurality of data inputs comprise documentation from the telecommunications domain), the plurality of machine learning models may comprise a (e.g. pre-trained) Bert machine learning model. Alternatively or in addition, in some embodiments, the plurality of machine learning models may comprise a word level TF-OF machine learning model and/or a character level TF-IDF machine learning model. For example, in embodiments where the plurality of data inputs comprise documentation from the telecommunications domain, a vocabulary of telecommunications documentation may be used as a word corpus for these machine learning models. In some embodiments, at least one machine learning model of the plurality of machine learning models may be trained to drop terms that appear frequently in more than a first predefined percentage (e.g. 80%) of data inputs and/or terms that appear rarely in less than a second predefined percentage (e.g. 1%) of data inputs. Alternatively or in addition, in some embodiments, the plurality of machine learning models may comprise a word2vec machine learning model with pooling trained on data inputs (e.g. telecommunications documentation). In these embodiments, the machine learning model may generate the data input representations (e.g. embeddings) by pooling all of the word representations (e.g. embeddings).

Figure 10:
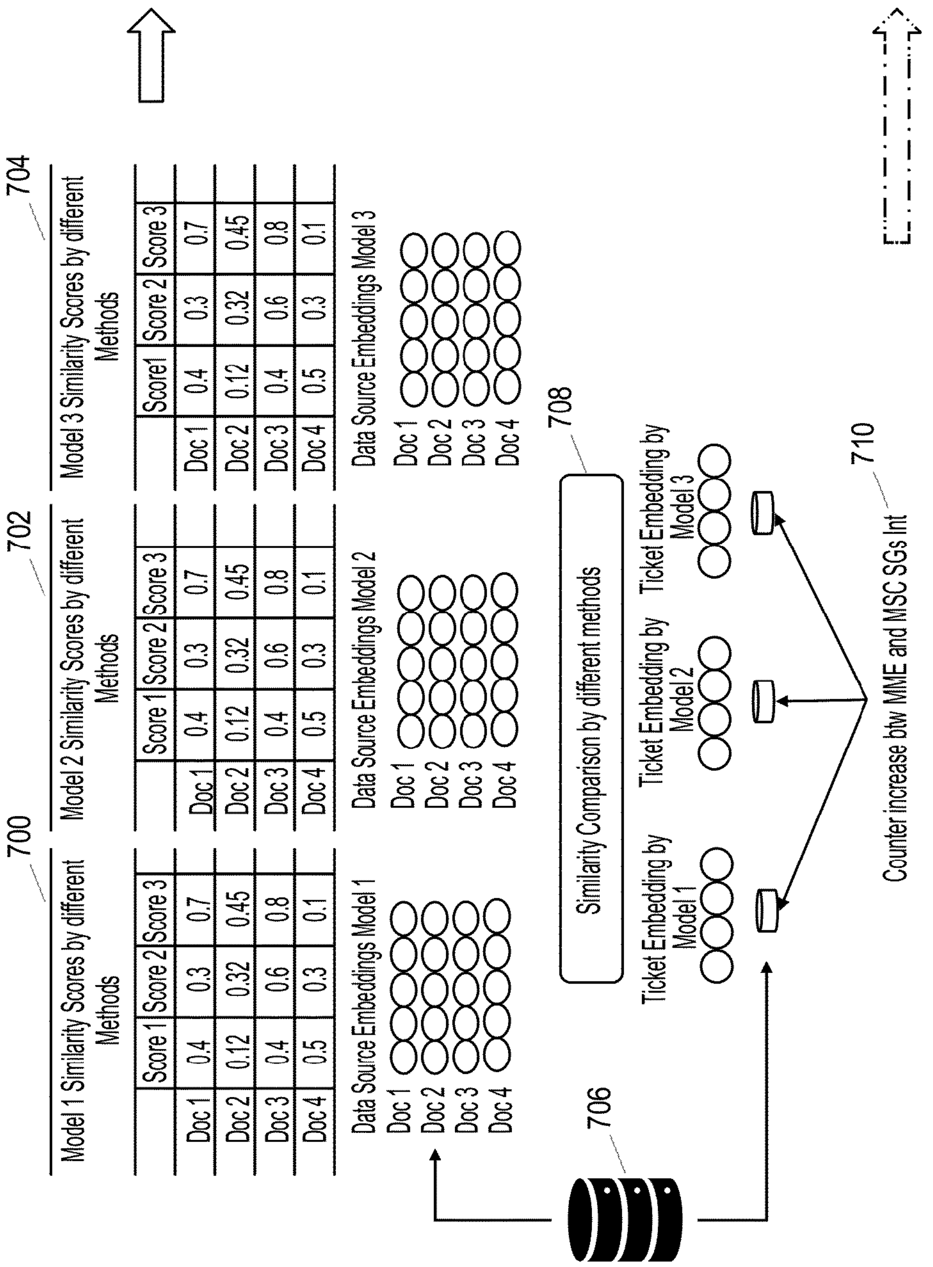

FIG. 10 illustrates a method for identifying one or more data inputs for use in resolving an issue in a network. The method illustrated in FIG. 10 may be performed by the second entity 20 (e.g. the processing circuitry 22 of the second entity) described herein according to some embodiments. The method illustrated in FIG. 10 can be used to identify one or more data inputs of a plurality of data inputs that are relevant to the issue based on a generated representation of information about the issue in the network.

As illustrated in FIG. 10, information 710 about the issue in the network may be received, e.g. via an API of the system. The received information 710 may comprise, for example, information about a change (e.g. increase) in a (e.g. performance) counter value at a node in the network. In some embodiments, the received information 710 may comprise text and/or numerical information. In some embodiments, the information 710 may be received when an SR is raised (e.g. by an agent).

As illustrated in FIG. 10, in response to receiving the information 710, a representation of the information is generated using at least one trained machine model of a plurality of machine learning models. For example, in the embodiment illustrated by FIG. 10, each of three machine learning models (i.e. “Model 1”, “Model 2”, and “Model 3”) generates a respective representations (i.e. “Ticket Embedding by Model 1”, “Ticket Embedding by Model 2”, and “Ticket Embedding by Model 3”) of the received information 710. Although FIG. 10 illustrates three machine learning models being used to generate the representations of the information 710, it will be understood that any other number of machine learning models may be used to generate the representations. In some embodiments, the plurality of machine learning models may be stored in a memory (e.g. database 706). The generated representations of the information 710 may be in the form of a vector representation according to some embodiments. For example, the generated representations of the information 710 may be a sparse or dense vector representation.

Although not illustrated in FIG. 10, the received information 710 may be pre-processed before being input into the at least one machine learning model of the plurality of machine learning models. The pre-processing of the information 710 may comprise extracting relevant components of the information 710 or, more specifically, of the issue. In some embodiments, the information extraction may be performed using one or more text analytic techniques (e.g. pattern matching), salient feature extraction, and/or any other information extraction technique. In some embodiments, pre-processing the information 710 may comprise cleaning the information. The information may be cleaned, for example, using a NLP technique (e.g. lemmatisation or any other NLP technique), acronym replacement and/or any other cleaning techniques.

As illustrated in FIG. 10, one or more data inputs 726 of a plurality of data inputs that are relevant to the issue are identified 724 based on the generated representation of the information 710 about the issue. The one or more identified data inputs 726 are for use in resolving the issue. As also illustrated in FIG. 10, in some embodiments, identifying 724 the one or more data inputs 726 comprises comparing 708 the generated representation of the information 710 about the issue to a representation of each data input of the plurality of data inputs generated using at least one trained machine learning model of the plurality of trained machine learning models, and identifying 724 one or more data inputs of the plurality of data inputs that are relevant to the issue based on the comparison.

For example, with reference to FIG. 10, the generated representations (i.e. "Ticket Embedding by Model 1", "Ticket Embedding by Model 2", and "Ticket Embedding by Model 3") of the information 710 are compared 708 to representations of a plurality of data inputs (i.e. "Doc1", "Doc2", "Doc3", and "Doc4"). The representation of each data input may be an (e.g. vector) embedding representation. In some embodiments involving at least two trained machine learning models, one or more trained machine learning models of the at least two trained machine learning model may be configured to generate a representation in a different manner to one or more other trained machine learning models of the at least two trained machine learning model. Therefore, in some embodiments, each trained machine learning model of at least two trained machine learning models may generate a different representation of the information 710. The method used to generate the representation can depend on the parameters and/or type of machine learning model used to generate the representation.

As illustrated in FIG. 10, in some embodiments, identifying 724 one or more data inputs of the plurality of data inputs that are relevant to the issue based on the comparison 708 may comprise determining (e.g. calculating) 700, 702, 704, based on the comparison 708, at least one similarity metric between the generated representation of the information 710 about the issue and the generated representation of each data input, and identifying 724 one or more data inputs 726 of the plurality of data inputs that are relevant to the issue based on the at least one determined similarity metric. In the example illustrated in FIG. 10, the at least one similarity metric is at least one similarity score. However, it will be understood that any other similarity metric may be used.

With reference to FIG. 10, in some embodiments, the comparison 708 may be performed for each machine learning model of the at least one machine learning model ("Model 1", "Model 2", "Model 3"). For example, the representation of the information 710 generated by a first machine learning model ("Model 1") in FIG. 10 can be compared to the representations of each of the data inputs ("Doc1", "Doc2", "Doc3", and "Doc4") generated by the first machine learning model ("Model 1"). The same comparison can be performed for the representation of the information 710 generated by the second and third machine learning models ("Model 2" and "Model 3"). The comparison can be performed via a variety of techniques.

In some embodiments, for each machine learning model ("Model 1", "Model 2", "Model 3"), a plurality of similarity scores ("Score 1", "Score 2", and "Score 3") between the representation of the information 710 about the issue generated using that model and the generated representation of each data input ("Doc1", "Doc2", "Doc3", "Doc4") may be determined. In some embodiments, each similarity score of the plurality of similarity scores ("Score 1", "Score 2", and "Score 3") may be determined using a different similarity score technique.

As illustrated in FIG. 10, in some embodiments, for each data input ("Doc1", "Doc2", "Doc3", "Doc4"), the plurality of similarity scores ("Score 1", "Score 2", "Score 3") determined for each machine learning model ("Model 1", "Model 2", "Model 3") can be combined (or aggregated) in order to determine a corresponding plurality of combined similarity scores. These combined similarity scores can be referred to as parameters ("Parameter 1", "Parameter 2", "Parameter 3") 712, 714, 716 and they can be used to identify 724 the one or more data inputs 726 of the plurality of data inputs. Thus, as illustrated in FIG. 10, the one or more data inputs 726 ("Doc 3", "Doc 1", "Doc 2") of the plurality of data inputs that are relevant to the issue can be identified 724 based on at least one determined similarity metric. In this way, the one or more data inputs 726 that are determined to be most similar to the information about the issue in the network can be identified for use in resolving the issue.

In some embodiments multiple different types of similarity metrics may be used to determine a measure of the similarity between the generated representation of the information about the issue and the generated representation of each data input. For example, the similarity metrics that are used can comprise a similarity score, a word overlap, rank statistics, and/or any other similarity metric. In some embodiments, a weighted combination of a plurality of similarity metrics may be used to identify the one or more data inputs that are relevant to the issue. In some of these embodiments, the weights associated with each similarity metric may be trained based on collected feedback, e.g. from one or more users such as one or more users of the network. In this way, the method may prioritise different machine learning and/or similarity techniques for different data inputs, e.g. depending on one or more properties of the different data inputs (such as the data source from which those data inputs are acquired).

A variety of similarity metrics can be used to effectively identify the one or more data inputs of the plurality of data inputs that are relevant to the information about the issue in the network. Table 1 illustrates some examples of such similarity metrics.

TABLE 1

Examples of similarity metrics.

| Similarity metric | Description |
|---|---|
| partial_word_overlap | Count of words common between a slogan of the SR and the main content of a document (example headings and title of a document). |

TABLE 1-continued

Examples of similarity metrics.

| Similarity metric | Description |
|---|---|
| total_content_overlap | Count of words common between the entire SR and each document |
| rank_model_similarity_metrics_n | Each document is ranked by each machine learning model based on different similarity metrics (indicated by n) by comparing the representations generated by the model for the SR and each document. |
| avg_rank_similarity_metrics_n | Average of ranks for each document is considered as the deciding factor. This gives the overall standing of similarity of document to SR. |
| avg_rank_top_2_similaritymetrics_n | Average rank by the top two machine learning models for each document is considered as the deciding factor. This ensures one poor machine learning model ranking does not drag down the score of a document. |
| max_rank_similarity_metrics_n | Highest ranked documents by each machine learning model are considered as the deciding factor. This ensures the top ranked documents by each machine learning model are given preference. |

Any one or more of the similarity metrics illustrated in Table 1 can be used in the method described herein. In embodiments where a plurality of similarity metrics are used, a weight may be assigned to each of similarity metric of the plurality of similarity metrics. The weight can, for example, be based on feedback. The weight assigned to each similarity metric of the plurality of similarity metrics can define a priority with which the similarity metric is determined relative to other similarity metrics. Although Table 1 refers to an SR, it will be understood that the similarity metrics can apply to any other type of information about an issue in the network. Similarly, although Table 1 refers to a document, it will be understood that the similarity metrics can apply to any other type of data input comprising information about the network.

Figure 11:
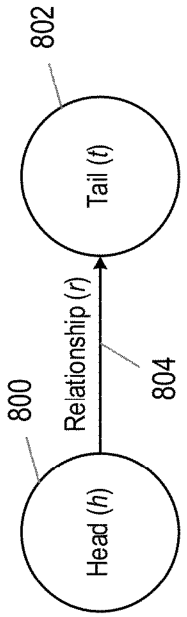
FIG. 11 is a schematic illustration of an example element of a knowledge graph.

FIG. 11 illustrates an example element of a knowledge graph. A knowledge graph (KG), as referred to herein, can be defined as a data structure used to organise (e.g. complex) information. A KG can be generated from a variety of data sources. In general, as illustrated in FIG. 11, the simplest way to represent a KG is by a set of triples 800, 802, 804. Each triple 800, 802, 804 can take the form (h, r, t) and represents an edge in the KG. Specifically, h refers to the head entity 800, r refers to the relationship 804, and t refers to the tail entity 802. The relationship 804 is the relationship between the head entity 800 and the tail entity 802. As described earlier, in some embodiments, the information about one or more nodes of the plurality of nodes of the network can be acquired from a KG. With reference to the KG illustrated in FIG. 11, in these embodiments, the head entity 800 and the tail entity 802 may represent two nodes of the plurality of nodes of the network and the relationship 804 can represent the relationship between the two nodes.

An example of information that can be represented in a KG is documentation (e.g. product documentation). Representing documentation in a KG can provide easy access to the information comprised in the documentation and enable efficient automation in processes which involve the analysis of the information in the document. In general, documentation (e.g. product documentation) can involve a consistent format and terminology allowing for consistent information (e.g. node information) extraction from the documentation. For example, network (e.g. telecommunications network) documentation usually comprises consistent text fields (e.g. title, headings, etc.) and can also include similar terms within the text of the documentation. Relationships and dependencies between nodes are also often explicitly mentioned in the network documentation. Some network documentation can be provided in a structured format, such as an extensible markup language (XML) format, which can make the task of information representation in a KG easier.

Figure 12:
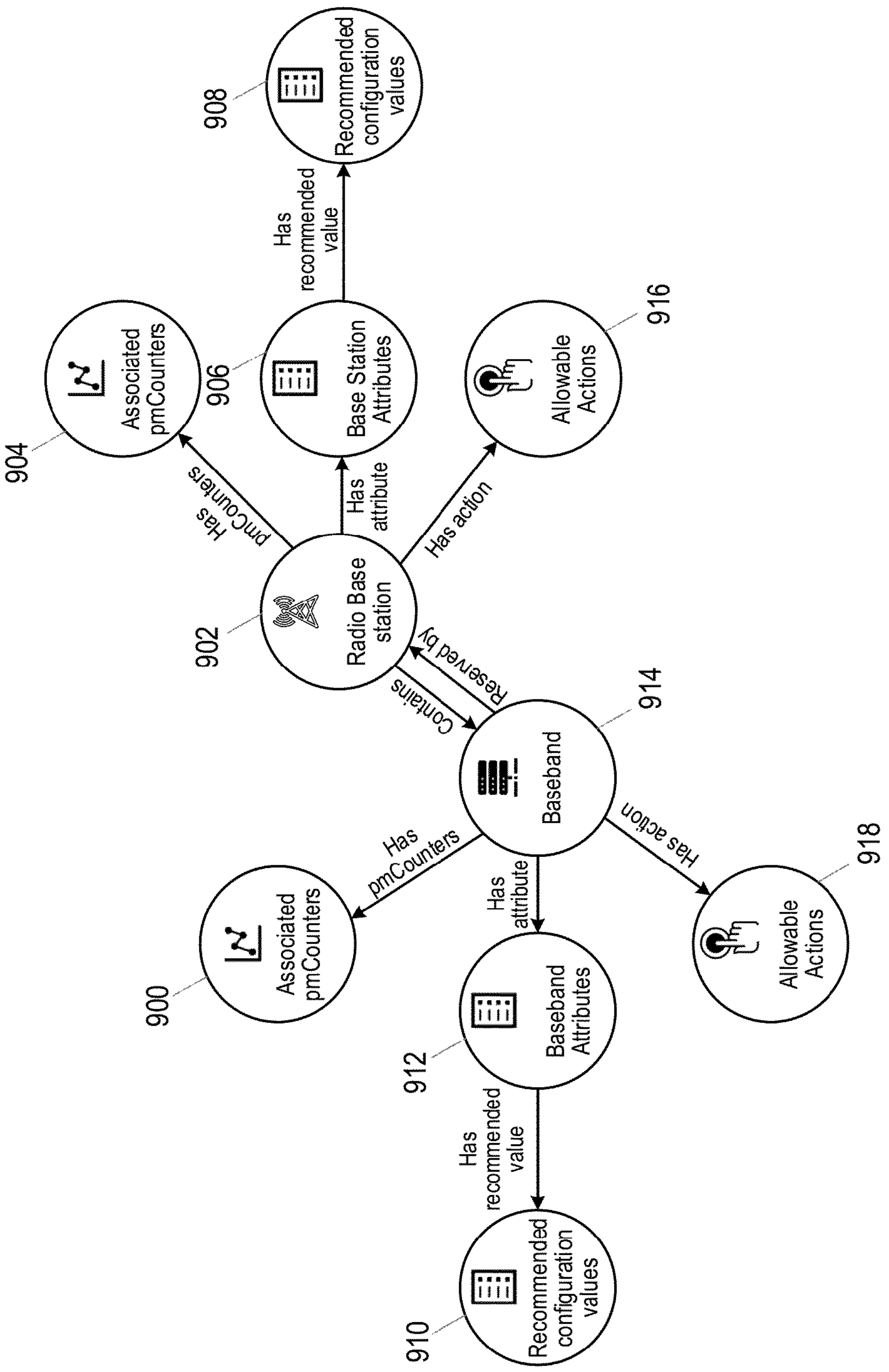
FIG. 12 is a schematic illustration of an example knowledge graph.

FIG. 12 illustrates an example knowledge graph (KG). More specifically, the KG illustrated in FIG. 12 shows different nodes 900, 902, 904, 906, 908, 910, 912, 914, 916, 918 of a network and the relationships between those nodes. The KG illustrated in FIG. 12 can be created using product documentation. The information about one or more nodes of the plurality of nodes of the network referred to herein can be acquired from a KG such as that illustrated in FIG. 12.

Table 2 illustrates an example KG base ontology for representing network information in a KG. Specifically, Table 2 comprises KG elements and a description of those elements in relation to a (e.g. telecommunications) network.

TABLE 2

Examples of a KG elements.

| Knowledge Graph Element | Description |
|---|---|
| Node | A node is a resource available in the network. It can be a software or hardware component and can be defined in product documentation. |
| Attributes | Attributes are configurable parameters associated with a node. These may be used to change the behaviour of the node. |
| Actions | Actions are the actions that can be performed on a node e.g. frequency allocations, variable assignments, etc. These may be different from attributes as they can be set when starting or deploying a node and may not have default values. |

TABLE 2-continued

Examples of a KG elements.

| Knowledge Graph Element | Description |
|---|---|
| Associated PM Counters | Performance management (PM) counters that are used to measure and observe the different performance related aspects of a node. |
| Relationships | Relationships between nodes can comprise any one or more of the following types: contains: represents a parent-child relationship between nodes. reserved by: represents nodes that have dependencies on each other and are required to function together. has Action: identifies actions that a particular node can perform. has pmCounter: identifies performance counters associated with a node. has attribute: identifies parameters associated with a particular node. has recommended value: identifies recommended values for attributes based on product documentation. |

Figure 13:
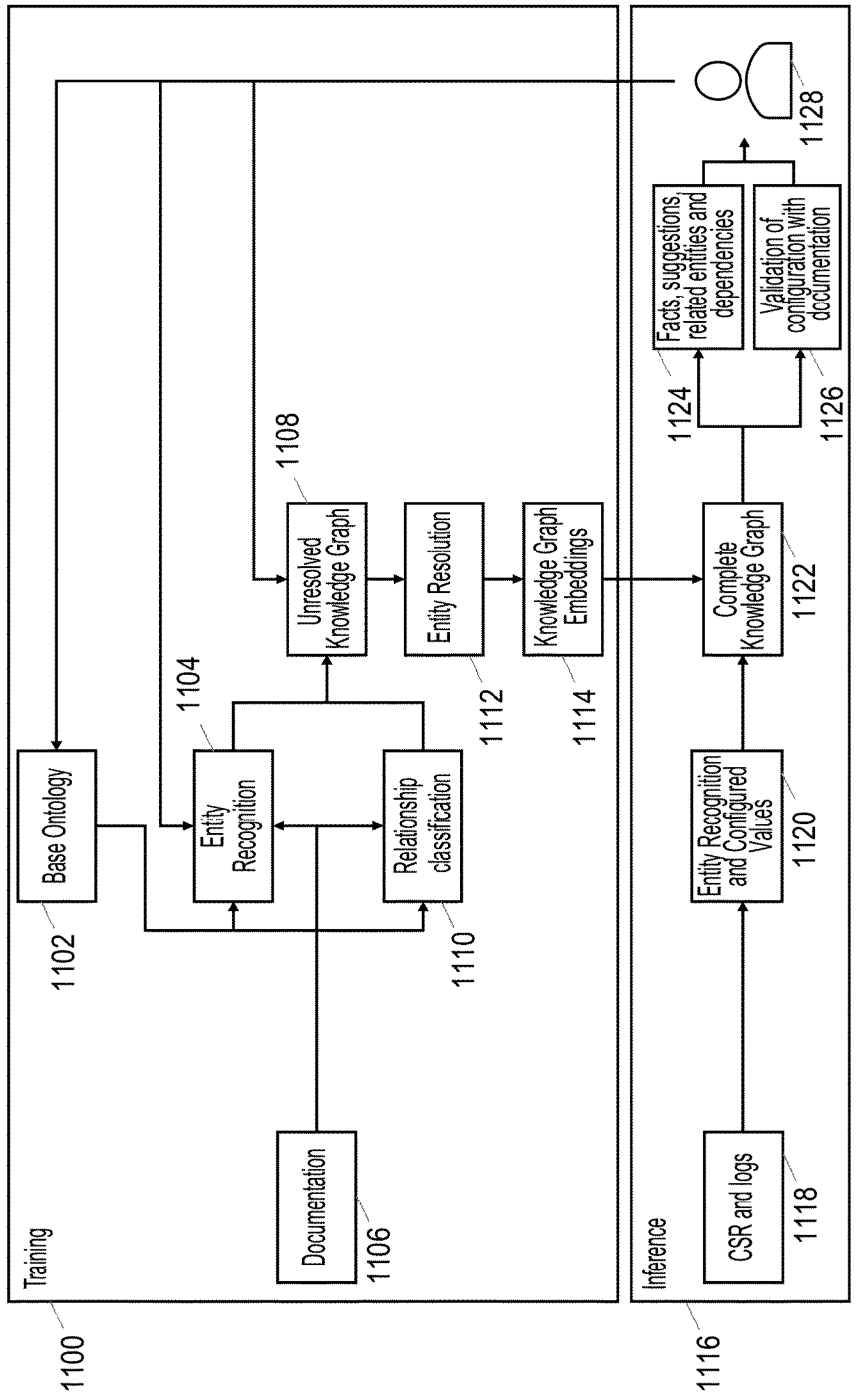
FIG. 13 is a schematic illustration of a method according to an embodiment.

FIG. 13 illustrates a method according to an embodiment. More specifically, FIG. 13 illustrates a method for processing a plurality of data inputs comprising information about a network and a method of identifying one or more data inputs for use in resolving an issue in the network.

The method illustrated in FIG. 13 comprises a training phase 1100 and an inference phase 1116. In some embodiments, the first entity 10 (or the processing circuitry 12 of the first entity 10) described herein may be configured to perform the steps described with reference to the training phase 1100. In some embodiments, the second entity 20 (or the processing circuitry 22 of the second entity 20) described herein may be configured to perform the steps described with reference to the inference phase 1116.

In the training phase 1100 of FIG. 13, a plurality of data inputs can be used to create a complete KG. With reference to FIG. 13, the training phase 1100 comprises processing a plurality of data inputs 1106 comprising information about a network. Although FIG. 13 illustrates the plurality of data inputs 1106 as comprising documentation, it will be understood that documentation is merely one type of data input and the plurality of data inputs 1106 can comprise any other types of data input, and any combination of types of data inputs.

In some embodiments, the documentation illustrated as the plurality of data inputs 1106 in FIG. 13 can comprise a description of one or more (e.g. all) nodes (e.g. hardware and/or software nodes) in the network and documentation (e.g. network product documentation) available for those one or more nodes. In some embodiments, the documentation (e.g. one or more documents) may be obtained from the one or more nodes of the network. In some embodiments, documentation may be the primary data input 1106 for creating the KG. In some embodiments, the documentation can comprise text. For example, the documentation can comprise (e.g. detailed) descriptions of the one or more nodes, one or more attributes of the one or more nodes, one or more dependencies (or relationships) between the one or more nodes, and/or other details. In some scenarios, such as is a telecommunications network, the documentation can be in a more structured format, such as an XML format.

As illustrated at blocks 1104 and 1110 of FIG. 13, the plurality of data inputs 1106 are analysed to generate information 1122 about the one or more nodes of the network. As illustrated in FIG. 13, in some embodiments, the analysis may comprise entity recognition 1104 and/or relationship classification 1110.

The entity recognition 1104 can also be referred to as named entity recognition (NER). The entity recognition 1104 can be used to extract information (or data) from one or more data inputs of the plurality of data inputs 1106. In particular, the entity recognition 1104 can be used to identify one or more nodes of the network. Examples of nodes of the network that may be identified can comprise components of the network, such as one or more baseband nodes, one or more antenna units, one or more software components, one or more performance counters, and/or any other node(s) of the network. In some embodiments, entity recognition can comprise identifying nodes by applying rule-based recognition and/or pattern recognition to one or more data inputs of the plurality of data inputs 1106. For example, a node named "EUtranCellTDD" can be extracted from a document in an XML format using the tag "class".

The relationship classification 1110 can also be referred to as relationship extraction (RE). The relationship classification 1110 can be used to extract information (or data) from one or more data inputs of the plurality of data inputs 1106. In particular, the relationship classification 1110 can be used to identify relationships between one or more nodes in the network. In some embodiments, the relationship classification 1110 may be supervised or unsupervised. The relationship classification 1110 may be typically highly domain specific since relationships are usually contingent on the context of the issue in the network and/or the network domain. However, certain types of data input, such as documentation, can comprise data associated with node relationships. For example, product documentation in a telecommunications network usually includes specific sections covering these relationships. In some embodiments, relationships may be extracted from one or more data inputs using text analysis and/or rule-based extraction techniques. For example, relationship extraction may be readily performed on a data input which is structured in an XML format. In a particular example, the node "EUtranCellTDD" may be associated with many relationships, such as an action "changeFrequency". This relationship may be extracted (identified) using the tag "action" in the product documentation associated with the node "EUtranCellTDD". Similarly, an attribute relationships such as "eUtranCellTDDId" can be identified using the tag "attribute".

As illustrated in FIG. 13, a base ontology 1102 can be used to assist in analysing the plurality of data inputs. More specifically, the base ontology 1102 can be used to assist with the entity recognition 1104 and/or the relationship classification 1110. A base ontology can be described as information about potential nodes of the network and relationships between nodes, which may be identified from the one or more data inputs. For example, the base ontology can define which nodes of the network are to be classified as a particular type of node of the network. Therefore, in some embodiments, the base ontology 1102 can comprise information that can be used to identify one or more nodes and/or one or more relationships between the one or more nodes in the network. The base ontology 1102 may be generated based on information comprised in the plurality of data inputs 1106 (e.g. network product documentation). In some embodiments, the base ontology 1102 may be updated using feedback, e.g. from one or more users 1128. The base ontology may, for example, be updated at random or at periodic intervals. The base ontology 1102 may be generated using supervised or unsupervised methods. In some embodiments, the unsupervised method may comprise automatic ontology induction from text. Alternatively or in addition, the base ontology 1102 may be generated from existing taxonomies available for products in existing SR management systems (e.g. node names). Table 2 illustrates an example of a base ontology 1102 for a (e.g. telecommunications) network that can be used.

As also illustrated in FIG. 13, in some embodiments, the analysis of the plurality of data inputs may generate information about a plurality of nodes of the network in the form of an unresolved knowledge graph (KG) 1108. An unresolved KG 1108 can be described herein as a KG that has not been resolved to identify whether it comprise at least one node that refers to the same node of the network.

As illustrated in FIG. 13, in some embodiments, the unresolved KG 1108 may be processed using entity resolution 1112. The entity resolution 1112 is an (e.g. algorithmic) approach for identifying nodes of a KG that refer to the same node of the network. Commonly, node resolution can be a complex problem. However, the analysis of certain data inputs, such as formal product documentation, has the advantage of using consistent names for nodes of the network, which makes this task much simpler. In some embodiments, a simple string comparison between node names can be used to identify all of the valid nodes in one or more data inputs.

As also illustrated in FIG. 13, in some embodiments, the elements of the KG may be processed in order to generate representations (e.g. embeddings) 1114 of the elements of the KG. For example, one or more vectors may be used to represent the elements of the KG. Therefore, in some embodiments, the representation 1114 of one or more elements of the KG may be a vector embedding representation. In an example, a vector representation may be generated for each triple of the KG. A triple of the KG can be as described earlier with reference to FIG. 11. For example, a triple of the KG may be in the form (h, r, t). A vector representation of the triple (h, r, t) may be generated from the relationship r that translates h to t (i.e. $h+r \approx t$. The KG representations (e.g. vector embeddings) may be used to extrapolate probable relationships that may not be explicitly mentioned in the plurality of data inputs 1106. This allows new triples to be added to the KG 1122. In some embodiments, the well-recognised translating embeddings (TransE) process may be used for generating the representations (e.g. embeddings) 1114, due to its proven performance in a variety of applications.

As illustrated in FIG. 13, the KG 1122 may be a product of the training phase 1100. The KG 1122 can comprise one or more (e.g. resolved) network nodes as well as (e.g. implied) relationships between the one or more nodes (e.g. based on the generated embeddings). In some embodiments, each node of the KG 1122 may represent a node of the plurality of nodes of the network and each edge of the KG 1122 may represent a relationship between two nodes of the plurality of nodes of the network.

In the inference phase 1116, information may be acquired for use in resolving an issue in the network. More specifically, information about one or more nodes of a plurality of nodes of the network, which are mentioned in information 1118 about the issue in the network, may be acquired 1124 from a KG 1122. The KG 1122 may be a KG generated by one or more of the method steps performed in the training phase 1100 described above.

In more detail, as illustrated in FIG. 13, information 1118 about the issue in the network may be received. In the embodiment illustrated in FIG. 13, the information 1118 about the issue may comprise a customer service request (CSR) and logs. A CSR is a service request (SR) raised by a network customer. However, it will be understood that the information 1118 about the issue can comprise any type of SR and can comprise one or more SRs. Logs can refer to one or more log files associated with the issue in the network. For example, logs may comprise one or more log files associated with a network node that has encountered the issue in the network (e.g. network failure). Although the embodiment illustrated in FIG. 13 shows that the information 1118 about the issue in the network comprises a CSR and logs, it will be understood that the information 1118 about the issue may comprise any type of information about the issue, and any combination of types of information, about the issue.

As illustrated in FIG. 13, in some embodiments, the information 1118 about the issue in the network can be processed 1120 in order to identify any nodes mentioned in the information 1118. This processing 1120 can be referred to herein as entity (or node) recognition. In some embodiments, one or more of the techniques described with reference to the entity recognition 1104 of the training phase 1110 of FIG. 13 may be applied during the processing 1120 of the information 1118 about the issue in the network. In some embodiments, the information about the issue in the network may include information indicative of one or more nodes that have been identified as relevant to the issue (e.g. problematic nodes).

In some embodiments, one or more nodes of the network may be identified from the KG 1122 based on the information extracted from the processing 1120 of the information 1118 about the issue. For example, in some embodiments, one or more (e.g. problematic) nodes identified from SR text can be used to identify one or more nodes in the KG 1122. The one or more nodes may be identified using simple string comparisons. In some embodiments, information about the one or more nodes may be acquired 1124 from the KG 1122. The information about the one or more nodes can, for example, comprise facts about the one or more nodes and/or one or more other nodes that the one or more nodes identified in the KG may have a relationship with. As illustrated in FIG. 13, in some embodiments, the information about the one or more nodes in the KG 1122 may be supplied to a user 1128, such as a customer support agent (CSA) and/or the user who raised the SR comprised in the information 1118 about the issue. In this way, the KG 1122 can be utilised to identify and highlight important facts, suggestions, relevant nodes, and/or dependencies (or relationships) that can be utilised by a user 1128 to resolve the issue in the network faster.

Although not illustrated in FIG. 13, in some embodiments, the acquired information about the one or more nodes from the KG (e.g. relevant facts) may comprise weighted information. For example, the acquired information may be weighted according to an identified priority. In particular, in some embodiments, the information may be weighted by the presence of other nodes identified in the information 1118 about the issue (e.g. an SR), such as based on one or more of any attributes, parameters, and performance counters that may be comprised in the information about the issue (e.g. information included in the CSR or mentioned by a user, such as a customer). For example, if an SR mentions that a performance counter “rrcestablishmentsuccessrate” is degraded for a node (e.g. a radio base station, RBS), the acquired information indicative of the relationship between the node and the performance counter “rrcestablishmentsuccessrate” may be weighted more heavily relative to other acquired information indicative of other node relationships. In this way, acquired information indicative of the relationship between the node and the performance counter "rrcestablishmentsuccessrate" can be provided to a user 1128 as relevant to resolving the issue in the network. In some embodiments, the KG 1122 may also comprise information about parameters which influence the performance counter. Information such as this may also be provided to the user 1128 for use in resolving the issue in the network.

As illustrated in FIG. 13, validation 1126 of the information 1118 about the issue in the network may be performed. In some embodiments, the validation 1126 can be referred to as validation of configuration with documentation. The validation 1126 may comprise comparing the information 1118 about the issue in the network with the information comprised in the KG 1122. For example, one or more log files comprised in the information 1118 about the issue (e.g. log files corresponding to an SR) may comprise (e.g. important) information about a node of the network. For example, the one or more log files may comprise information indicative of a configuration and/or performance of the node of the network. Therefore, the information 1118 about the issue in the network can be compared to the KG 1122 to identify whether one or more nodes of the network are performing normally or abnormally. In some embodiments, the information 1118 about the issue may be compared to the KG 1122 to identify one or more nodes in the KG 1122 and, by analysing relationships between the one or more nodes in the KG 1122, recommended allowable ranges (e.g. of values) for one or more parameters of the one or more nodes of the KG 1122 can be identified. In some embodiments, the information 1118 about the issue may comprise a configured value (e.g. as a key-value pair) for a network node parameter. In these embodiments, the configured value may be (e.g. automatically) compared with a recommended value (e.g. range). This comparison can be used to identify any anomalies in (e.g. nodes of) the network. The anomalies may be used to help resolve the issue in the network. As illustrated in FIG. 13, in some embodiments, information indicative of the anomalies may be provided to a user 1128.

As also illustrated in FIG. 13, feedback can be obtained from a user 1128 for input into the training phase 1100. For example, in some embodiments, a user 1128 can provide feedback on the information acquired 1124 from the KG 1122. For example, the user 1128 can provide feedback on the quality of the acquired information. The quality of the acquired information may be indicative of how useful the information is for resolving the issue in the network. More specifically, in an example, if the information acquired 1124 from the KG 1122 comprises information of a relationship that a node of the network has with another node of the network, the user 1128 may provide feedback on how useful this information is in resolving the issue in the network. In some embodiments, the information acquired 1124 from the KG 1122 may comprise a recommendation for use in resolving the issue. The user feedback can be in the form of 'likes' and 'dislikes' for information acquired 1124 from the KG (e.g. specific recommendations) as a result of the analysis of the information 1118 about the issue in the network (e.g. a service request).

In some embodiments, the feedback can comprise information indicative of new elements (e.g. a particular node that was absent in the KG 1122), which can be represented in the KG 1122 and/or base ontology 1102. In some embodiments, the feedback may be indicative of a relationship which may be added or edited between two nodes represented in the KG 1122. The feedback may be used to tune the KG 1122 completion by validating the relationships inferred using the KG representations (e.g. vector embeddings) as well as adapting the base ontology to reflect new elements, relationships, and/or nodes as information about the network and/or the issue in the network. Therefore, the feedback allows the KG 1122 to be updated over time.

Figure 14:
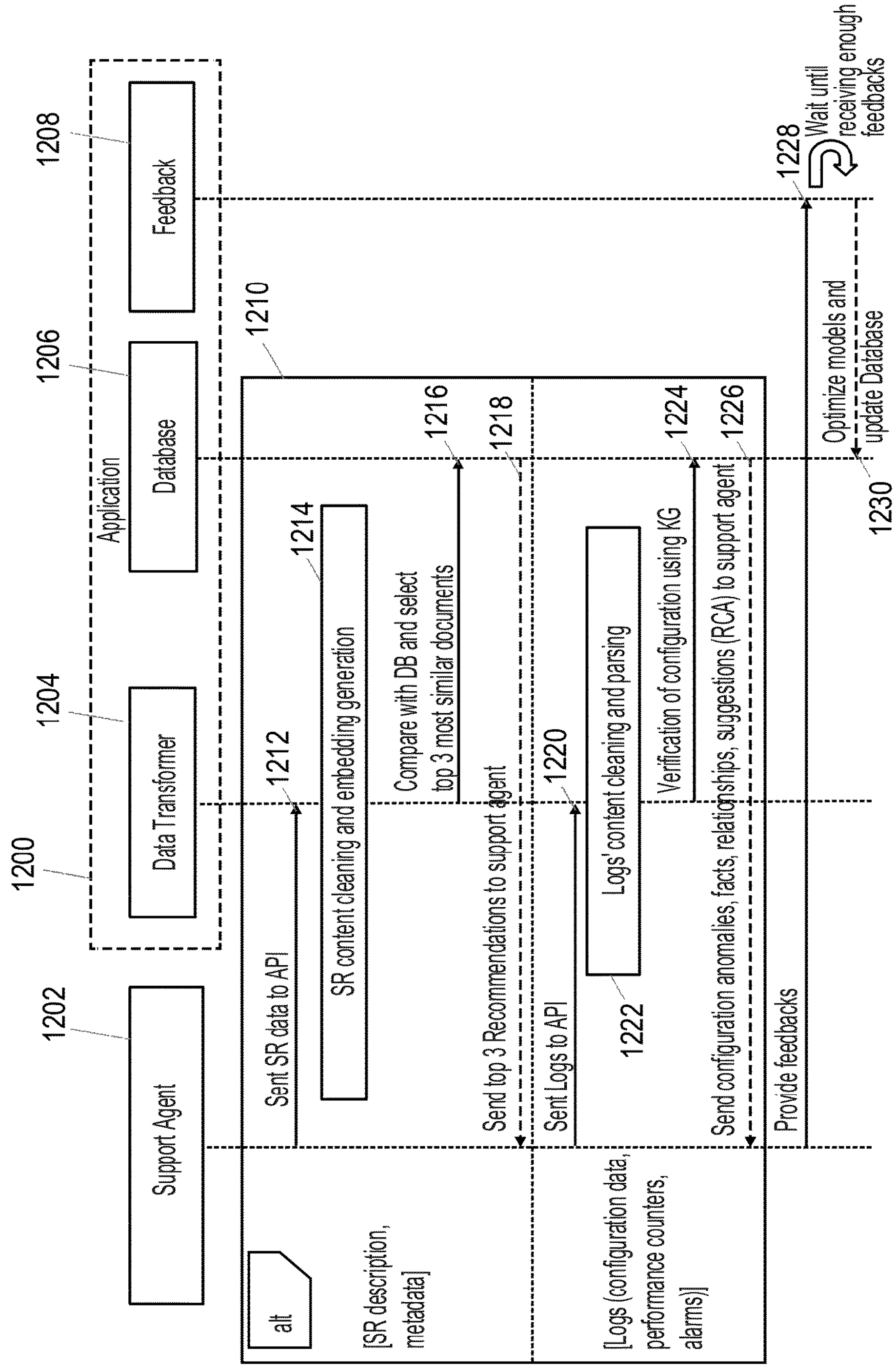
FIG. 14 is a signalling diagram illustrating an exchange of signals in a system according to an embodiment.

FIG. 14 is a signalling diagram illustrating an exchange of signals in a system according to an embodiment. More specifically, FIG. 14 illustrates a method performed by a system, which can be used for identifying one or more data inputs for use in resolving an issue in the network. As illustrated in FIG. 14, the system may comprise a user (e.g. support agent) 1202 and an application 1200. Although FIG. 14 illustrates the user 1202 as being a support agent, it will be understood that the user 1202 may be any other user.

The application 1200 illustrated in FIG. 14 may also be referred to as an application programming interface (API). As illustrated in FIG. 14, in some embodiments, the application 1200 may comprise a data transformer 1204, a database 1206 and a feedback module 1208. Although FIG. 14 illustrates these modules as being comprised in the same node (e.g. the application 1200), it will be understood that the modules may be comprised in different nodes from each other. Although not illustrated in FIG. 14, in some embodiments, the second entity 20 (e.g. the processing circuitry 22 of the second entity 20) may comprise the application 1200. Thus, the steps described herein with reference to the application 1200, the data transformer 1204, the database 1206 and/or the feedback module 1208 can also be said to be performed by the second entity (e.g. the processing circuitry 22 of the second entity 20).

As illustrated at block 1210 of FIG. 14, in some embodiments, the application 1200 can be configured to perform the identification of one or more data inputs for use in resolving an issue in the network as described herein (e.g. with reference to steps 426 and 428 of FIG. 7).

In more detail, as illustrated by arrow 1212 of FIG. 14, the application 1200 (e.g. the data transformer 1204) may receive information about the issue in the network. As also illustrated in FIG. 14, the information about the issue may be received from a user 1202. In some embodiments, the information about the issue can comprise an SR. Alternatively, or in addition, the information about the issue in the network may comprise different types of data, such as metadata, logs (e.g. log files), and/or any other type of information about the issue. The issue in the network may comprise a network failure, a network error, a network fault, and/or any other type of network issue. The network may be a telecommunications network or any other type of network.

In some embodiments, as illustrated at block 1214 of FIG. 14, the application 1200 (e.g. the data transformer 1204) may, in response to receiving the information about the issue in the network, generate a representation of the information about the issue using at least one trained machine learning model of a plurality of trained machine learning models. For example, the application 1200 (e.g. the data transformer 1204) may generate a computer-recognisable format, such as a vector embedding representation, of the information about the issue. The application 1200 (e.g. the data transformer 1204) may also be configured to pre-process the information about the issue as described earlier. For example, the application 1200 (e.g. the data transformer 1204) may clean the information about the issue in the network. In some embodiments, the received information about the issue may comprise information in an unstructured format. In some embodiments, the generated representation of the information about the issue can represent the information in a structured format.

In some embodiments, as illustrated by arrow 1216 of FIG. 14, the application 1200 (e.g. the data transformer 1204) may identify one or more data inputs of a plurality of data inputs that are relevant to the issue based on the generated representation of the information about the issue. The one or more identified data inputs are for use in resolving the issue. In some embodiments, the application 1200 (e.g. the data transformer 1204) can perform the identification of one or more data inputs for use in resolving an issue in the network as described earlier with reference to FIG. 10.

For example, although not illustrated in FIG. 14, in some embodiments, the application 1200 (e.g. the data transformer 1204) may identify the one or more data inputs by comparing the generated representation of the information about the issue to a representation of each data input of the plurality of data inputs generated using at least one trained machine learning model of the plurality of trained machine learning models and identifying the one or more data inputs based on the comparison. In an example, the identification of one or more data inputs may comprise the comparison of the generated representation of the issue about the information with one or more representations of documentation stored in a memory (e.g. database 1206). In some embodiments, as illustrated by arrow 1216 of FIG. 14, the identification may comprise identifying the three (or any other number of) most similar data inputs (e.g. documents). As illustrated by arrow 1218 of FIG. 14, in some embodiments, the application 1200 (e.g. the database 1206) may transmit the identified one or more data inputs that are relevant to the issue towards the user 1202. For example, the one or more identified data inputs for use in resolving the issue may be transmitted towards the user 1202 from whom the information about the issue in the network was received 1212.

As illustrated by arrow 1220 of FIG. 14, in some embodiments, the application 1200 (e.g. the data transformer 1204) may receive information about the issue in the network. As illustrated in FIG. 14, the information about the issue in the network can comprise logs (e.g. log files). The logs may be associated with information comprised in an SR also comprised in the received information about the issue. Although arrows 1212 and 1220 of FIG. 14 illustrate that more than one receipt of information about the issue can occur at the application 1200 (e.g. the data transformer 1204), it will be understood that, in some embodiments, the information received at arrows 1212 and 1220 by the application 1200 (e.g. the data transformer 1204) may be comprised in a single transmission received at the application 1200 (e.g. the data transformer 1204). In some embodiments, the information about the issue in the network may be obtained from a memory and/or one or more nodes in the network.

In some embodiments, as illustrated at block 1222 of FIG. 14, the application 1200 (e.g. the data transformer 1204) may process the information about the issue in the network. As mentioned earlier, processing of the information about the issue may comprise one or more scraper, parser and/or extraction techniques. In some embodiments, a representation of the information about the issue is generated. This may be performed in order to covert the information into a structured format. The processing performed at block 1222 of FIG. 14 can be referred to herein as cleaning.

As illustrated by arrow 1224 of FIG. 14, in some embodiments, the application 1200 (e.g. the data transformer 1204) may acquire information about one or more nodes of a plurality of nodes of the network that are mentioned in the information about the issue, e.g. from the database 1206. The acquired information about the one or more nodes can be for use in resolving the issue. In some embodiments, the information about one or more nodes of the plurality of nodes of the network can be acquired from a KG. The KG can be as described earlier, e.g. with reference to FIGS. 11-13. The information acquired from the KG may be used for configuration verification of one or more nodes in the network and/or one or more relationships between the one or more nodes. For example, if the information about the network comprises information indicative of one or more nodes in the network, the KG may be utilised to identify information about the one or more nodes. More specifically, the KG can be used to acquire information indicative of configuration exceptions, (e.g. potential) anomalies, facts, relationships, and/or recommendations associated with the one or more nodes. In some embodiments, the KG may be stored in a memory (e.g. database 1206).

In some embodiments, as illustrated by arrow 1226 of FIG. 14, the application 1200 (e.g. the data transformer 1204) may transmit the acquired information about the one or more nodes in the network towards the user 1202. In some embodiments, the acquired information may comprise information indicative of configuration exceptions, (e.g. potential) anomalies, facts, relationships, and/or recommendations associated with the one or more nodes. Therefore, the user (e.g. a support agent 1202) can be provided with the acquired information about the one or more nodes.

As illustrated by arrow 1228 of FIG. 14, in some embodiments, the application 1200 (e.g. the feedback module 1208) may receive feedback from the user 1202. The feedback may comprise feedback on the one or more identified data inputs for use in resolving the issue and/or the acquired information about the one or more network nodes. For example, the feedback may comprise feedback indicative of the usefulness of the one or more identified data inputs and/or the acquired information about the one or more network nodes in resolving the issue in the network.

In some embodiments, as illustrated by arrow 1230 of FIG. 14, based on the feedback, the application 1200 (e.g. the feedback module 1208) may adapt a weight assigned to the at least one trained machine learning model used to generate the representation of the information about the issue. The weight assigned to the at least one trained machine learning model can define a priority with which the at least one machine learning model is used relative to other machine learning models in a subsequent generation of the representation of information about the issue. Therefore, in some embodiments, the one or more machine learning models may be optimised based on the feedback. In some embodiments, the adaptation based on the feedback may only be performed when the amount of feedback received reaches a predefined threshold amount. Any adaptations made in response to receiving feedback may be stored in memory (e.g. the database 1206).

The feedback can be useful in fine-tuning (e.g. optimising) a machine learning model for a particular task. In some situations, a machine learning model may only be effective when fine-tuned for the particular task the model is configured to carry out. In general, for domain-specific tasks, obtaining labelled data for use in training a machine learning model is challenging. A feedback-driven approach can ensure that the training and/or performance (e.g. inference ability) of a machine learning model is optimised to both the relevant domain in which the machine learning model operates and the data inputs processed by the machine learning model.

The feedback referred to herein may be used to adapt a configuration of one or more machine learning models of a plurality of machine learning models and/or a manner in which the one or more machine learning models process data input. In some embodiments, the feedback may be indicative of whether a user 'likes' or 'dislikes' an output from the one or more machine learning models. For example, a user may provide feedback on whether an identified data input for use in resolving an issue in the network was actually useful in resolving the issue following the use of the identified data input in resolving the issue. In some embodiments, the feedback may comprise information indicative of another data input (e.g. a document) which the user found useful in resolving the issue. In some embodiments, the other data input (e.g. document) which the user found useful may not have been originally identified. The feedback information can be used to optimise one or more of the plurality of machine learning models and/or one or more method steps performed by the first entity 10 and/or the second entity 20 referred to herein.

Table 3 illustrates different types of user feedback which may be received.

TABLE 3

An example of user feedback.

| Ticket | Prediction | User Response |
|---|---|---|
| Ticket 1 | Prediction 1 | Liked |
| Ticket 2 | Prediction 2 | Disliked |
| Ticket 3 | Prediction 3 | Ignored |
| Ticket 4 | Prediction 4 | User provided recommendation |

A "Ticket", as mentioned in Table 3, may refer to information received about an issue in the network. For example, the ticket may comprise a service request raised by a user of the network, and/or one or more logs (e.g. associated with the service request). A "Prediction", as mentioned in Table 3, may refer to one or more identified data inputs of a plurality of data inputs that are relevant to the issue based on a generated representation of the information about the issue. The one or more identified data inputs are identified in response to receiving information about the issue, and are for use in resolving the issue. The one or more identified data inputs may be provided to the user for use in resolving the issue. A "User Response", as mentioned in the Table 3, may refer to the feedback provided by the user on the "Prediction". For example, for "Ticket 1" of Table 3, one or more data inputs may be identified based on a generated representation of the information comprised in "Ticket 1" using a plurality of machine learning models. The one or more identified data inputs in this case may be referred to as "Prediction 1". The "User Response" to "Prediction 1" indicates that the user "Liked" "Prediction 1". Thus, the user feedback received after use of "prediction 1" in resolving the issue in the network indicates that the user found "Prediction 1" useful in resolving the issue.

During training of the plurality of machine learning models described herein, the parameters (e.g. hyperparameters) of each machine learning model can influence the performance of the model. For example, the parameters (e.g. hyperparameters) of a machine learning model can influence how the model generates a representation of a data input (e.g. a document) of a plurality of data inputs. By adapting parameters (e.g. hyperparameters) of a machine learning model (e.g. using user feedback), the representation of each data input generated by the machine learning model may be representative of the most relevant information of the data input (e.g. the information most useful in identifying a data input for use in resolving an issue in the network). As mentioned previously, the parameters (e.g. hyperparameters) of a machine learning model may be weighted based on user feedback.

Table 4 illustrates an example of a hyperparameter that may be tuned for a machine learning model.

TABLE 4

An example of machine learning model hyperparameters.
Weighted parameters for model training ($\theta_n$)

| | |
|---|---|
| $\theta_1 \ldots \theta_n$ | Hyperparameters for unsupervised model training (varies based on model) |

As described earlier, in some embodiments, a similarity metric between a generated representation of information about an issue in the network and a generated representation of each data input may be used in identifying one or more data inputs of a plurality of data inputs that are relevant to the issue. The similarity metric may be determined based on a comparison, as described earlier. Therefore, the similarity metric can play a role in the identification (e.g. selection) of one or more data inputs for use in resolving the issue in the network. In some embodiments, feedback (e.g. from a user) may be used to adapt a weight assigned to each similarity metric of a plurality of similarity metrics. For example, different techniques for similarity comparison between generated representations of the information about the issue and the generated representations of one or more data inputs can be weighted according to the feedback.

Table 5 illustrates an example of how different similarity techniques (e.g. for producing similarity metrics) may be configured.

TABLE 5

An example of weights assigned to similarity techniques

| Weighted parameters for similarity ($W_n$) | Similarity technique |
|---|---|
| $W_1$ | Similarity score by model 1 using method 1 |
| $W_2$ | Similarity score by model 1 using method 2 |
| $W_3$ | Similarity score by model 2 using method 1 |
| $W_4$ | Rank by word overlap length |
| $W_5$ | Average rank by top two models |

In some embodiments, during the inference phase, the similarity technique may play a crucial role in the identification (or selection) of the most relevant data inputs, e.g. for each data source. The feedback can be used to train the weights that influence the impact of each similarity metric. By prioritising and penalising different parameters, the recommendation module can be representative of the domain and/or the data source.

In some embodiments, a function can be used to adapt the (e.g. parameters or hyperparameters of) one or more machine learning models of the plurality of machine learning models and/or the one or more similarity metrics as described herein. In an example, the function that is used for this purposes can be a cost function. The cost function may predict which data inputs a user is more likely to find useful in resolving an issue in the network. In this way, the cost function can be used to provide more useful information that can be used to resolve the issue. The cost function can be used to achieve more "liked" recommendations and "user-provided recommendations". The cost function may be configured to penalise recommendations that a user has "disliked" in favour of other recommendations, such as "new recommendations". Such an approach can (e.g. automatically) enable a user to decide the model performance, e.g. how data inputs are identified for use in resolving the issue in the network. Moreover, this approach can be useful for domain-specific tasks, as it avoids the need for large amounts of pre-labelled data.

An example of a (multi-objective) cost function is defined as follows:

$$\text{Cost Function}=\text{minimise}(L(F_n),D(F_n)).$$

The symbol "F" denotes a function of machine learning model parameters and/or similarity parameters (or metrics). For example, the machine learning model parameters may comprise hyperparameters in the form of a vector (e.g. $[\theta_1, \theta_2, \theta_3 \ldots, \theta_n]$). The similarity parameters may comprise ensemble similarity parameters in the form of a vector (e.g. $[\omega_1, \omega_2, \omega_3 \ldots, \omega_n]$). "L($F_n$)" and "D($F_n$)" denote objective functions. More specifically, in some embodiments, "L($F_n$)" may denote a negative count of feedbacks "liked" by a user and/or cases where a user provided uniform resource locator (URL) was given as a prediction. This can indicate an ideal scenario. It may be an aim to optimise the "L($F_n$)" function. In some embodiments, "D($F_n$)" may denote a count of feedbacks "disliked" by the user. The cost function may penalise the objective function "D($F_n$)". In some embodiments, the functions "L($F_n$)" and "D($F_n$)" can be calculated as follows:

$$L(F_n) = -1\sum_{n=0}^{N} \begin{matrix} 1 & \text{, if } Pred_{provided(\theta,\omega)} = Pred_{liked(\theta,\omega)} \\ 1 & \text{, if } Pred_{provided(\theta,\omega)} = Pred_{userprovided(\theta,\omega)} \end{matrix}$$

$$D(F_n) = +1\sum_{n=0}^{N} 1, \text{ if } Pred_{provided(\theta,\omega)} = Pred_{disliked(\theta,\omega)}.$$

In the above equations, "I" denotes the number of feedbacks provided by the user. Therefore, the cost function defined above may be used to optimise some of the method steps described herein. For example, a pareto-optimal solution is provided by using the cost function, such that no feasible parameters exist that may increase the likelihood of dislikes and simultaneously decrease the likelihood of likes.

There is also provided a computer program comprising instructions which, when executed by processing circuitry (such as the processing circuitry 12 of the first entity 10 described herein and/or the processing circuitry 22 of the second entity 20 described herein), cause the processing circuitry to perform at least part of the method described herein. There is provided a computer program product, embodied on a non-transitory machine-readable medium, comprising instructions which are executable by processing circuitry (such as the processing circuitry 12 of the first entity 10 described herein and/or the processing circuitry 22 of the second entity 20 described herein) to cause the processing circuitry to perform at least part of the method described herein. There is provided a computer program product comprising a carrier containing instructions for causing processing circuitry (such as the processing circuitry 12 of the first entity 10 described herein and/or the processing circuitry 22 of the second entity 20 described herein) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first entity functionality and/or the second entity functionality described herein can be performed by hardware. Thus, in some embodiments, the first entity 10 and/or the second entity 20 described herein can be a hardware entity. However, it will also be understood that optionally at least part or all of the first entity functionality and/or the second entity functionality described herein can be virtualized. For example, the functions performed by the first entity 10 and/or second entity 20 described herein can be implemented in software running on generic hardware that is configured to orchestrate the first entity functionality and/or the second entity functionality. Thus, in some embodiments, the first entity 10 and/or second entity 20 described herein can be a virtual entity. In some embodiments, at least part or all of the first entity functionality and/or the second entity functionality described herein may be performed in a network enabled cloud. Thus, the method described herein can be realised as a cloud implementation according to some embodiments. The first entity functionality and/or second entity functionality described herein may all be at the same location or at least some of the functionality may be distributed, e.g. the first entity functionality may be performed by one or more different entities and/or the second entity functionality may be performed by one or more different entities.

It will be understood that at least some or all of the method steps described herein can be automated in some embodiments. That is, in some embodiments, at least some or all of the method steps described herein can be performed automatically. The method described herein can be a computer-implemented method.

Therefore, as described herein, there is provided an advantageous technique for processing a plurality of data inputs comprising information about a network and identifying one or more data inputs for use in resolving an issue in the network. The techniques provided herein can help to map received information about an issue in the network (e.g. informal data) to one or more data inputs (e.g. formal data) for use in resolving the issue in the network. In comparison to existing techniques used in resolving an issue in a network, the techniques described herein are far less cumbersome due to the automation of identifying one or more data inputs for this use.

The techniques described herein provide an advantageous way in which to handle multiple types of data (e.g. both formal and informal data) without the need to mix and match independent machine learning models for different types of data. The techniques described herein enable reliable inference (e.g. predictions) without the need for labelled data. In particular, the plurality of machine learning models described herein can be trained exclusively on one or more data inputs, such as structured technical documents, which enables the plurality of machine learning models to capture the correct (e.g. semantic) relationship between the one or more data inputs, such as the technical terms within structured technical documents. The plurality of machine learning models can be used to generate embeddings of (e.g. informal) text like that of an SR.

As mentioned above, the techniques described herein can also be adaptive to feedback and may continuously learn on the go using a feedback driven mechanism. Certain parameters used for inference by the plurality of machine learning models, which may heavily influence the identification of one or more data inputs, may be optimised by received user feedback. In particular, a feedback driven approach, such as that described herein, can help to handle mapping of received information about an issue in a network to one or more useful data inputs (e.g. product documentation that is useful for resolving the issue). The technique described herein may continuously update weights associated with the plurality of machine learning models based on the feedback received from a user. This user driven approach can allow the plurality of machine learning models to adapt to domain specific tasks.

The techniques described herein may also advantageously adapt to changes in the network domain itself. For example, the techniques described herein can readily assimilate one or more new data inputs, such as new product documentation. Specifically, in the resolution of an issue in the network, such as SR resolution in a telecommunications network, keeping up to date with new products and software (often introduced every quarter and projected to occur more often as technology evolves) is a challenge. The use of the techniques described herein can provide reliable inference (e.g. recommendations) as soon as the network is updated, for example, as soon as product documentation is made available for new products. The techniques described herein are flexible to adding new data/knowledge due to the loosely coupled architecture in machine learning design.

The techniques described herein can cater to a variety of use case and this includes the telecommunication domain, where pre-trained NLP models fail to generalise. The telecommunications domain in particular encompasses specific vocabulary and terms, acronyms, proprietary interfaces, and documentation, which makes it harder to reuse existing NLP based approaches. Advantageously, the techniques described herein can be used to create a knowledge graph to validate information, e.g. logs in SRs. While knowledge graphs have been used for knowledge representation and open-world KGs are readily available, they fail in domain specific situations (such as in the niche telecommunications domain). By creating an ontology and KG specific to the relevant domain and optionally also to the product, it can be ensured that the techniques described herein are effective.

Overall, the techniques described herein can be used to provide a faster and more reliable resolution of an issue in a network (e.g. SR resolution). This can help to reduce operating expenses (OPEX), reduce the workload of a CSA, and reduce the duration of potential problems and/or outages existing in the network, which can be beneficial to the operator of the network and the user(s) of the network.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer-implemented method for identifying one or more data inputs for use in resolving an issue in a network, the method comprising:

in response to receiving information about the issue in the network:

generating a representation of the information about the issue using at least one trained machine learning model of a plurality of trained machine learning models;

identifying one or more data inputs of a plurality of data inputs that are relevant to the issue based on the generated representation of the information about the issue, wherein the one or more identified data inputs are for use in resolving the issue, wherein identifying one or more data inputs of a plurality of data inputs that are relevant to the issue based on the generated representation of the information about the issue comprises:

comparing the generated representation of the information about the issue to a representation of each data input of the plurality of data inputs generated using at least one trained machine learning model of the plurality of trained machine learning models; and identifying one or more data inputs of the plurality of data inputs that are relevant to the issue based on the comparison, and wherein identifying one or more data inputs of the plurality of data inputs that are relevant to the issue based on the comparison comprises:

determining, based on the comparison, at least one similarity metric between the generated representation of the information about the issue and the generated representation of each data input; and identifying one or more data inputs of the plurality of data inputs that are relevant to the issue based on the at least one determined similarity metric.

2. The method as claimed in claim 1, wherein:

the received information about the issue comprises information in an unstructured format; and the generated representation of the information about the issue represents the information in a structured format.

3. The method as claimed in claim 1, wherein:

the generated representation of the information about the issue captures one or more semantic relationships in the information about the issue.

4. The method as claimed in claim 1, the method comprising:

acquiring information about one or more nodes of a plurality of nodes of the network that are mentioned in the information about the issue, wherein the acquired information about the one or more nodes is for use in resolving the issue.

5. The method as claimed in claim 4, wherein:

the information about one or more nodes of the plurality of nodes of the network is acquired from a knowledge graph, wherein each node of the knowledge graph represents a node of the plurality of nodes of the network and each edge of the knowledge graph represents a relationship between two nodes of the plurality of nodes of the network.

6. The method as claimed in claim 1, the method comprising:

receiving feedback from a user following the use of the one or more identified data inputs in resolving the issue; and adapting, based on the received feedback, a weight assigned to the at least one trained machine learning model used to generate the representation of the information about the issue, wherein the weight assigned to the at least one trained machine learning model defines a priority with which the at least one machine learning model is used relative to other machine learning models in a subsequent generation of the representation of information about the issue.

7. The method as claimed in claim 1, wherein:

the one or more data inputs identified based on the at least one determined similarity metric are the one or more data inputs for which the determined similarity metric exceeds a predefined threshold.

8. The method as claimed in claim 1, the method comprising:

determining, based on the comparison, a plurality of different similarity metrics between the generated representation of the information about the issue and the generated representation of each data input;

identifying one or more data inputs of the plurality of data inputs that are relevant to the issue based on the determined plurality of different similarity metrics;

receiving feedback from a user following the use of the one or more identified data inputs in resolving the issue; and adapting, based on the received feedback, a weight assigned to each similarity metric of the plurality of different similarity metrics, wherein the weight assigned to each similarity metric of the plurality of different similarity metrics defines a priority with which the similarity metric is determined relative to other similarity metrics in a subsequent determination of at least one similarity metric between the generated representation of information about the issue in the network and the generated representation of each data input.

9. A system comprising:

a first entity comprising processing circuitry configured to:

train a plurality of machine learning models on a plurality of data inputs comprising information about a network, wherein each machine learning model of the plurality of machine learning models is trained to generate a representation of at least one data input of the plurality of data inputs; and generate a representation of each data input of the plurality of data inputs using at least one trained machine learning model of the plurality of trained machine learning models, wherein the plurality of trained machine learning models and the generated representation of each data input are for use in resolving an issue in the network; and a second entity comprising processing circuitry configured to, in response to receiving information about the issue in the network:

generate a representation of the information about the issue using at least one trained machine learning model of the plurality of trained machine learning models; and identify one or more data inputs of a plurality of data inputs that are relevant to the issue based on the generated representation of the information about the issue, wherein the one or more identified data inputs are for use in resolving the issue, wherein identifying one or more data inputs of a plurality of data inputs that are relevant to the issue based on the generated representation of the information about the issue comprises:

comparing the generated representation of the information about the issue to the representation of each data input of the plurality of data inputs generated using at least one trained machine learning model of the plurality of trained machine learning models; and identifying one or more data inputs of the plurality of data inputs that are relevant to the issue based on the comparison, and wherein identifying one or more data inputs of the plurality of data inputs that are relevant to the issue based on the comparison comprises:

determining, based on the comparison, at least one similarity metric between the generated representation of the information about the issue and the generated representation of each data input; and identifying one or more data inputs of the plurality of data inputs that are relevant to the issue based on the at least one determined similarity metric.

* * * * *